(12) United States Patent
Fitzgerald et al.

(10) Patent No.: US 8,234,641 B2
(45) Date of Patent: *Jul. 31, 2012

(54) COMPLIANCE-BASED ADAPTATIONS IN MANAGED VIRTUAL SYSTEMS

(75) Inventors: Joseph Fitzgerald, Franklin Lakes, NJ (US); Oleg Barenboim, Fort Lee, NJ (US)

(73) Assignee: ManageIQ, Inc., Mahwah, NJ (US)

( * ) Notice: Subject to any disclaimer, the term of this patent is extended or adjusted under 35 U.S.C. 154(b) by 892 days.

This patent is subject to a terminal disclaimer.

(21) Appl. No.: 11/945,935

(22) Filed: Nov. 27, 2007

(65) Prior Publication Data

US 2008/0134177 A1 Jun. 5, 2008

Related U.S. Application Data

(63) Continuation-in-part of application No. 11/550,362, filed on Oct. 17, 2006.

(51) Int. Cl.
G06F 9/455 (2006.01)
G06F 9/00 (2006.01)
G06F 7/04 (2006.01)

(52) U.S. Cl. ................. 718/1; 726/24; 726/11

(58) Field of Classification Search .............. None
See application file for complete search history.

(56) References Cited

U.S. PATENT DOCUMENTS

| | | |
|---|---|---|
| 5,581,764 A | 12/1996 | Fitzgerald |
| 5,761,477 A | 6/1998 | Wahbe |
| 6,000,000 A | 12/1999 | Hawkins |
| 6,085,244 A | 7/2000 | Wookey |
| 6,169,976 B1 | 1/2001 | Colosso |
| 6,253,258 B1 * | 6/2001 | Cohen .................... 719/331 |
| 6,292,889 B1 | 9/2001 | Fitzgerald |
| 6,381,677 B1 | 4/2002 | Beardsley |
| 6,711,660 B1 | 3/2004 | Milne |
| 6,772,330 B2 | 8/2004 | Merkin |
| 6,850,252 B1 | 2/2005 | Hoffberg |

(Continued)

FOREIGN PATENT DOCUMENTS

CA 2547630 6/2005

(Continued)

OTHER PUBLICATIONS

Written Opinion of the International Searching Authority for International Application No. PCT/US08/84823 dated Jan. 22, 2009.

(Continued)

*Primary Examiner* — Camquy Truong
(74) *Attorney, Agent, or Firm* — K&L Gates LLP

(57) ABSTRACT

Techniques are disclosed for controlling and managing virtual machines and other such virtual systems. VM execution approval is based on compliance with policies controlling various aspects of VM. The techniques can be employed to benefit all virtual environments, such as virtual machines, virtual appliances, and virtual applications. For ease of discussion herein, assume that a virtual machine (VM) represents each of these environments. In one particular embodiment, a systems management partition (SMP) is created inside the VM to provide a persistent and resilient storage for management information (e.g., logical and physical VM metadata). The SMP can also be used as a staging area for installing additional content or agentry on the VM when the VM is executed. Remote storage of management information can also be used. The VM management information can then be made available for pre-execution processing, including policy-based compliance testing.

25 Claims, 16 Drawing Sheets

U.S. PATENT DOCUMENTS

| | | | |
|---|---|---|---|
| 7,024,549 B1 | 4/2006 | Luu | |
| 7,100,195 B1 | 8/2006 | Underwood | |
| 7,272,799 B2* | 9/2007 | Imada et al. | 715/767 |
| 7,496,757 B2 | 2/2009 | Abbott | |
| 7,506,265 B1 | 3/2009 | Traut | |
| 7,555,551 B1* | 6/2009 | McCorkendale et al. | 709/225 |
| 7,577,722 B1 | 8/2009 | Khandekar | |
| 7,577,828 B2 | 8/2009 | Sammer | |
| 7,594,185 B2 | 9/2009 | Anderson | |
| 7,698,545 B1 | 4/2010 | Campbell | |
| 7,802,084 B2 | 9/2010 | Fitzgerald | |
| 7,890,951 B2* | 2/2011 | Vinberg et al. | 717/174 |
| 2002/0073236 A1 | 6/2002 | Helgeson | |
| 2003/0009752 A1 | 1/2003 | Gupta | |
| 2003/0037181 A1 | 2/2003 | Freed | |
| 2003/0070087 A1 | 4/2003 | Gryaznov | |
| 2004/0073899 A1 | 4/2004 | Luk et al. | |
| 2004/0128670 A1 | 7/2004 | Robinson | |
| 2004/0172550 A1 | 9/2004 | Sai | |
| 2004/0204266 A1 | 10/2004 | Owens | |
| 2004/0205101 A1 | 10/2004 | Radhakrishnan | |
| 2004/0210653 A1 | 10/2004 | Kanoor | |
| 2004/0268347 A1 | 12/2004 | Knauerhase et al. | |
| 2005/0033970 A1 | 2/2005 | Anson | |
| 2005/0125513 A1 | 6/2005 | Lam et al. | |
| 2005/0246436 A1 | 11/2005 | Day | |
| 2005/0262101 A1 | 11/2005 | Halpern | |
| 2005/0283640 A1 | 12/2005 | Cheston et al. | |
| 2005/0289542 A1 | 12/2005 | Uhlig et al. | |
| 2006/0004667 A1* | 1/2006 | Neil | 705/59 |
| 2006/0010440 A1 | 1/2006 | Anderson | |
| 2006/0025985 A1 | 2/2006 | Vinberg | |
| 2006/0026219 A1 | 2/2006 | Orenstein et al. | |
| 2006/0036570 A1 | 2/2006 | Schaefer | |
| 2006/0059253 A1 | 3/2006 | Goodman et al. | |
| 2006/0075252 A1 | 4/2006 | Kallahalla | |
| 2006/0136720 A1* | 6/2006 | Armstrong et al. | 713/164 |
| 2006/0136910 A1 | 6/2006 | Brickell et al. | |
| 2006/0136911 A1 | 6/2006 | Robinson et al. | |
| 2006/0155735 A1 | 7/2006 | Traut | |
| 2006/0179476 A1 | 8/2006 | Challener | |
| 2006/0184935 A1* | 8/2006 | Abels et al. | 718/1 |
| 2006/0184937 A1 | 8/2006 | Abels et al. | |
| 2006/0218536 A1 | 9/2006 | Kirilline et al. | |
| 2006/0218544 A1 | 9/2006 | Chakraborty | |
| 2006/0225065 A1 | 10/2006 | Chandhok | |
| 2006/0274060 A1 | 12/2006 | Ni | |
| 2006/0294421 A1 | 12/2006 | Schneider | |
| 2007/0043860 A1 | 2/2007 | Pabari | |
| 2007/0050409 A1 | 3/2007 | Bugir | |
| 2007/0050842 A1* | 3/2007 | Smith et al. | 726/12 |
| 2007/0130232 A1 | 6/2007 | Therrien | |
| 2007/0169121 A1* | 7/2007 | Hunt et al. | 718/1 |
| 2007/0179987 A1 | 8/2007 | Lim | |
| 2007/0180493 A1 | 8/2007 | Croft | |
| 2007/0192329 A1 | 8/2007 | Croft | |
| 2007/0198612 A1 | 8/2007 | Prahlad | |
| 2007/0198656 A1 | 8/2007 | Mazzaferri | |
| 2007/0204266 A1 | 8/2007 | Beaty et al. | |
| 2007/0208685 A1 | 9/2007 | Blumenau | |
| 2007/0214408 A1 | 9/2007 | Straub | |
| 2007/0230504 A1* | 10/2007 | Smith et al. | 370/469 |
| 2008/0016187 A1 | 1/2008 | Neil | |
| 2008/0126439 A1 | 5/2008 | Kaminsky | |

FOREIGN PATENT DOCUMENTS

| | | |
|---|---|---|
| WO | 2006036277 | 4/2006 |

OTHER PUBLICATIONS

Written Opinion of the International Searching Authority for International Application No. PCT/US07/81652 dated Apr. 23, 2008.
Written Opinion of the International Searching Authority for International Application No. PCT/US07/81646 dated May 5, 2008.
Written Opinion of the International Searching Authority for International Application No. PCT/US07/81647 dated Jun. 3, 2008.
Written Opinion of the International Searching Authority for International Application No. PCT/US07/81636 dated Jun. 3, 2008.
Written Opinion of the International Searching Authority for International Application No. PCT/US07/81644 dated Jun. 17, 2008.
Written Opinion of the International Searching Authority for International Application No. PCT/US08/84849 dated Jan. 12, 2009.
"Cache-Based System Management Architecture with Virtual Appliances, Network Repository and Virtual Appliance Transceivers," Jun. 9, 2005, 23 pages.
"Configuration Management," Hewlett-Packard Development Company, L.P., 2006 [online] [Retrieved on Dec. 15, 2006] Retrieved from the Internet <://openview.hp.com/solutions/ascm/index.html>.
"Configuration Management Solutions for Desktops," Hewlett-Packard Development Company, L.P., 2006, [online] [Retrieved on Dec. 15, 2006] Retrieved from the Internet <://openview.hp.com/products/radia_mdsk/index.html>.
"Configuration Management Solutions for Servers," Hewlett-Packard Development Company, L.P., 2006, [online] [Retrieved on Dec. 15, 2006] Retrieved from the Internet <://openview.hp.com/products/radia_msvr/index.html>.
"EFI Framework FAQs," American Megatrends, Inc., 2004, 4 pages.
"JP1 Version 7i Desktop Management," Hitachi Asia Ltd., 2005 4 pages.
"Managing Configurations and Compliance with Oracle Enterprise Manager 10g," An OracleWhite Paper, Oracle, Sep. 2005, 9 pages.
"Microsoft Windows XP: Using Software Restriction Policies to Protect Against Unauthorized Software," Mircrosoft TechNet, Jan. 1, 2002, 28 pages.
"MSN Reduces New Server Build and Deploy Time by 98 Percent," Microsoft Corporation, Sep. 2003, 6 pages.
"Unicenter CA—Teleview Session Management, Enterprise Systems Management," ca , 2006, [online] [Retrieved on Dec. 15, 2006] Retrieved from the Internet <://www3.ca.com/solutions/Product.aspx?ID=1525>.
VMTN—Virtual Appliances: How to Build a Virtual Appliance,: VMware, Inc., 2006, 9 pages.
"VMware ACE, Product Datasheet," VMware, Inc., 2005, 2 pages.
Apvrille, A. et al., "DigSig: Run-Time Authentication of Binaries at Kernel Level," 2004 LISA XVIII, Nov. 14-19, 2004, pp. 59-66.
Bakos, G., "Honeypots and the Enterprise: Intelligence-based Risk Management," Institute for Security Technology Studies, Dartmouth College, 98 pages, 2004.
Banerjee, S.et al., "Scalable Grid Service Discovery Based on UDDI," MGC '05, Nov. 28-Dec. 2, 2005, ACM, 6 pages.
Bloehdorn, S. et al., "TagFS—Tag Semantics for Hierarchical File Systems,"In Proceedings of the 6th International Conference on Knowledge Management (I-KNOW 06), Graz, Austria, Sep. 2-6, 2006, 8 pages, [online] Retrieved from the Internet <URL:http://semfs.ontoware.org/pubs/2008-2009-iknow2006-tegfs.pdf>.
Calder, B. et al., "The Entropia Virtual Machine for Destop Grids," VEE'05, ACM, Jun. 11-12, 2005, pp. 1-11.
Casper, B., "Using Network Appliance Snapshot Technology with VMware®ESX Server," Network Appliance, Inc., 2005, 14 pages.
Chen, Y., "Service-Oriented Computing: Architecture, Programming, and Applications," The Ninth IASTED International Conference on Software Engineering and Applications, Nov. 14-16, 2005, 40 pages.
Doser, J., "Generating Access Control Infrastructures from SecureUML Models," Albert-Ludwigs-Unversitat Freiburg, 24 pages, 2003.
Doser, J., "Using SecureUML to Secure Controllers," Albert-Ludwigs-Unversitat Freiburg. 28 pages, 2003.
Garfinkel, T. et al., "Terra: A Virtual Machine-Based Platform for Trusted Computing," SOSP '03, ACM, Oct. 19-22, 2003, pp. 193-206.
Garfinkel, T. et al., "When Virtual is Harder Than Real: Security Challenges in Virtual Machine Based Computing Environments," 6 pages, 2005.
Goldfein, J., "PAC095 Workstation 5 and Beyond: What's New," VMworld2005, Virtualize Now, 2005, 30 pages.
Haldar, V. et al., "Semantic Remote Attestation—A Virtual Machine Directed Approach to Trusted Computing," Proceedings of the Third Virtual Machine Research and Technology Symposium, USENIX Association, San Jose, CA, May 6-7, 2004, 14 pages.
International Search Report and Written Opinion of the International Searching Authority for International Application No. PCT/US08/84829, dated Jan. 22, 2009.
International Search Report and Written Opinion of the International Searching Authority for International Application No. PCT/US08/84834, dated Jan. 13, 2009.
International Search Report and Written Opinion of the International Searching Authority for International Application No. PCT/US08/84844 dated Jan. 16, 2009.
International Search Report and Written Opinion of the International Searching Authority for International Application No. PCT/US08/84860 dated Jan. 23, 2009.
Keahey, K. et al., "Virtual Infrastructure in the Grid," Jan. 30, 2006, 19 pages.
Keahey, K. et al., "Virtual Workspaces Achieving Quality of Service and Quality of Life in the Grid," 12 pages, 2005.
Kieffer, M., "Windows Virtualization Architecture," Microsoft Corporation, 2005, 23 pages.
Kim.H. et al., "Autograph: Toward Automated, Distributed Worm Signature Detection," 16 pages, 2004.
King, S.T. et al., "SubVirt: Implementing Malware with Virtual Machines," 14 pages, 2006.
Krsul, I. et al., "VMPLants: Providing and Managing Virtual Machine Executiopn Environments for Grid Computing," IEEE, 2004, pp. 1-12.
Laverick, M., "VMware ESX 2.1/5 Server Administration II, Documents Version 1.3" RTFM Education, 117 pages, 2006.
Lemos, R., "Your Own Personal Matrix," PC Magazine, Oct. 17, 2006, 1 page.
Lin, B. et al., Towards an Understanding of Decision Complexity in IT Configuration,: IBM Corporation, 2006, 16 pages.
Lu, W. et al., "Making Your Workspace Secure: Establishing Trust with VMs in the Grid," 10 pages, 2007.
MacFarland, A. "PlateSpin Builds Flexibility into a clone-Based Data Center Lifestyle," The Clipper Group Navigator, Feb. 8, 2006, pp. 1-4.
Martinez, P. et al., "Using the Script MIB for Policy-Based Configuration Management," 16 pages, 2002.
Mohan, P. et al., "Semantic File Retrieval in File Systems Using Virtual Directories," 4 pages, 2006, [online] Retrieved from the Internet <URL:.hipc.org/hipc2006/posters/semfs.pdf>.
Naik, V.K. et al., "Configuring, Deploying, and Managing Virtual Grid Environments," pp. 1-5, 2005.
Newsome, J. et al., "Polygraph: Automatically Generating Signatures for Polymorphic Worms," 16 pages, 2005.
Newsome, J. et al., "Polygraph: Automatically Generating Signatures for Polymorphic Worms," May 2005, 46 pages.
Potnis, N., "Debugging OS's with Time Traveling Virtual Machines," University of Michigan, 26 pages, 2006.
Reinhardt, M., "Energy-Aware Scheduling of Virtual Machines in a Multiprocessor Environment," Universitat Karlsruhe, Jun. 13, 2006, 86 pages.
Schenk, S. et al., "TagFS: Bringing Semantic Metadata to the Filesystem," Institute for Computer Science, University of Koblenz, 2 pages, [online] Retrieved from the Internet <URL://eswc2006.org/poster-papers/FP31-Schenk.pdf>.
Schenk, S. et al. "TagFS—TagSemantics for Hierarchical File Systems," 2006, University of Koblenz Landau Germany, 31 pages, [online] Retrieved from the Internet <URL://i-know.know-center.tugraz.at/content/download/734/2960/file/völkel.pdf>.
Sirer, E.G. et al., "Design and Implementation of a Distributed Virtual Machine for Networked Computers," SOSP-17, ACM, Dec. 1999, pp. 202-216.
St. Arnaud, B., "Service Oriented Architectures for R&E Networks Google Mashing Everything," CANARIE, Inc., 18 pages, 2006.
Stewart, V., "Network Appliance & VMware ESX Server: Instantaneous Backup & Recovery with NetApp Snapshot Technology," Oct. 2005, 15 pages.
Sufatrio et al., "A Machine-Oriented Integrated Vulnerability Database for Automated Vulnerability Detection and Processing," 2004 LISA XVII, Nov. 14-19, 2004, pp. 47-58.
Traugott, S. et al. "Why Order Matters: Turing Equivalence in Automated Systems Adminstration," USENIX Large Installation System Administration Conference, Nov. 3-8, 2002, pp. 1-35.
TRIUMF/HEPnet Lightpath Object Composition GUI, Canarie, 14 pages, 2005.
Verdon, D. et al. "Risk Analysis in Software Design," IEEE Security & Privacy, 2004, pp. 32-37.
VMworld2005 Virtualize Now, VMware Education Services Course, Las Vegas, Oct. 18-20, 2005, 10 pages.
Waldspurger, C., PAC485 Managing Datacenter Resources Using the VirtualCenter Distributed Resource Scheduler, VMWorld2005, VMware, Inc., 2005, 36 pages.
Wang, Y-M, et al., "Detecting Stealth Software with Strider GhostBuster," Dec. 13, 2004, Technical Report MSR-TR-2005-25, Microsoft Corporation, 11 pages.
Wang, Y-M, et al. Gatekeeper: Monitoring Auto-Start Extensibility Points (ASEPs) for Spyware Management, 2004 LISA XVIII, Nov. 14-19, 2004, pp. 33-46.
Whitaker, A. et al., "Using Time Travel to Diagnose Computer Problems," 6 pages, 2004.
Williams, M.A., "Anti-Trojan and Trojan Detection with In-Kernel Digital Signature Testing of Executables," NetXSecure NZ Limited, pp. 1-12, Apr. 16, 2002.
Zhao, X. et al., "SVGrid: A SecureVirtual Environment for Untrusted Grid Applications," pp. 1-8, 2005.
International Search Report and Written Opinion of the International Searching Authority for International Application No. PCT/US08/84853, dated Jan. 28, 2009.
Keahey, K., "Working Spaces: Virtual Machines in the Grid," Globus World 2005, Feb. 10, 2005, 23 pages.

* cited by examiner

COMPLIANCE-BASED ADAPTATIONS IN MANAGED VIRTUAL SYSTEMS

PRIORITY CLAIM

This application is a continuation-in-part of and claims priority to and the benefit of U.S. patent application Ser. No. 11/550,362, filed on Oct. 17, 2006, the entire contents of which are incorporated herein.

RELATED APPLICATIONS

This application is related to U.S. application Ser. No. 11/550,348, filed Oct. 17, 2006, titled "Control and Management of Virtual Systems." In addition, this application is related to U.S. application Ser. No. 11/550,356, filed Oct. 17, 2006, titled "Registering and Accessing Virtual Systems for Use in a Managed System." In addition, this application is related to U.S. application Ser. No. 11/550,364, filed Oct. 17, 2006, titled "Enforcement of Compliance Policies in Managed Virtual Systems." In addition, this application is related to U.S. application Ser. No. 11/550,368, filed Oct. 17, 2006, titled "Automatic Optimization for Virtual Systems." In addition, this application is related to U.S. application Ser. No. 11/945,945, filed Nov. 27, 2007, titled "Control and Management of Virtual Systems." In addition, this application is related to U.S. application Ser. No. 11/945,923, filed Nov. 27, 2007, titled "Registering and Accessing Virtual Systems for Use in a Managed System." In addition, this application is related to U.S. application Ser. No. 11/945,927, filed Nov. 27, 2007, titled "Enforcement of Compliance Policies in Managed Virtual Systems." In addition, this application is related to U.S. application Ser. No. 11/945,941, filed Nov. 27, 2007, titled "Automatic Optimization for Virtual Systems." Each of these applications is herein incorporated in its entirety by reference.

FIELD OF THE INVENTION

The invention relates to virtual execution environments, and more particularly, to the control and management of virtual systems such as virtual machines, virtual appliances, and virtual applications.

BACKGROUND OF THE INVENTION

Virtual machines are becoming increasingly prevalent and there are a number of commercial vendors and open source products providing or enabling virtual machine environments. Such enablement involves getting virtual machine monitors (hosts or VMMs) running on a variety of hardware platforms and then allowing virtual machines (guests or VMs) to run in those environments.

The VMs themselves are typically stored in vendor-version and implementation-specific formats, and there are utilities to create them and convert between the formats. Within a VM there are typically one or more virtual disks and some additional files containing description of the VM and the hardware it virtualizes, as well as some optional files like system snapshots of the VM at various stages of processing. There may also be a delta, difference, and undo/redo files for changes that are not committed to the VM virtual disks. In some grid environments (e.g., Globus®) there are the concepts of VM workspaces that contain virtual disks or partitions, one each for the operating system (OS), application, and the data.

One of the challenges in managing VMs is that VMs can be created in one vendor's environment, moved to another vendor's through a conversion utility, be moved between hosts (within a single vendor environment) during execution (e.g., VMware® VMotion, Microsoft® LiveMotion) and be snapshoted, copied, cloned, or templated. Each vendor, tool, and implementation has its own proprietary management instrumentation (e.g., VMware® has Virtual Center, VMI SDK, etc; Microsoft® has WMI, System Center Virtual Machine Manager, etc), its own repository, VM disk format, eventing technique and format, logging format and location, VM control file name and format. The formats may even differ within a single vendor's product family, as well as between versions of a product.

There are additional vendors like PlateSpin™ PowerConvert, Akimbi™ and Surgient® and others who provide tools and utilities that copy, transform, snapshot, template, manipulate and proliferate VMs within and between environments and formats. The original creator of a VM as well as anyone who wants to manage a VM has a very difficult task in determining who has the VM and is using it, which formats the VM has been converted to, and where and how many derivatives of the VM exist. Many enterprises are also trying to create and maintain central configuration management databases (CMDBs) which would have a very difficult time keeping up with all the VMs coming and going.

What is needed, therefore, are techniques for controlling and managing virtual machines and other such virtual systems.

SUMMARY OF THE INVENTION

One embodiment of the present invention provides a method for adapting virtual machines (VMs) for use in a managed system. The method includes determining (prior to executing a target VM) that the target VM is non-compliant with a policy-based compliance scheme, and adapting the target VM to conform with the policy-based compliance scheme. In one particular such case, determining that the target VM is non-compliant includes getting metadata associated with the target VM, getting compliance policies regarding the target VM, and applying the compliance policies against the metadata to determine if the target VM is compliant with the VM compliance scheme. In another particular such case, adapting the target VM includes direct manipulation of VM content. In another particular such case, adapting the target VM includes comprises direct manipulation of settings associated the target VM and/or an execution platform of the VM. In another such case, adapting the target VM includes insertion of data into the target VM. In another particular such case, adapting the target VM includes at least one of: updating virus definitions, installing anti-virus software, installing security patches, executing an anti-virus scanning application, removing malware, and disabling malware. The malware may include, for example, a virus, worm, trojan horse, rootkit, spyware, and/or adware. In another particular such case, adapting the target VM includes adjusting security settings. In another particular such case, adapting the target VM includes deleting unauthorized content. In another particular such case, adapting the target VM includes obtaining necessary licensing, and/or automatically issuing an email notification to an administrator to obtain licensing. In another particular such case, adapting the target VM includes scheduling an agent and/or process to carryout remedial action. Here, scheduling an agent and/or process may include requesting, transferring, downloading, and/or installing security updates and/or security patches. Alternatively, or in addition to, scheduling an agent and/or process may include searching for and/or eradicating malware. Alternatively, or in addition to, scheduling an agent and/or process may include registering the target VM for use in the managed system. In another particular such case, adapting the target VM includes restricting access permissions, so that the target VM can only access certain content, resources, and areas of the managed system. In another particular such case, adapting the target VM includes adding, updating, and/or deleting user account information, so as to limit account authority associate with the target VM. In another particular such case, adapting the target VM includes validating adaptations made. Here, validating adaptations made may include repeating policy-based compliance testing that was used to determine the target VM was non-compliant. In other particular such cases, determining that the target VM is non-compliant occurs after an appropriate VM event request is received and prior to performing the event requested on the target VM in response to that VM event request. The VM event requests received can be, for example, a start request, a stop request, a pause request, a move request, a clone request, a create new request, a display from template request, or any other suitable VM event request. The target VM can be, for example, a virtual application, virtual appliance, or other such virtual system or special purpose virtual process.

Another embodiment of the present invention provides one or more machine-readable mediums (e.g., one or more compact disks, diskettes, servers, memory sticks, or hard drives) encoded with instructions, that when executed by one or more processors, cause the processor to carry out a process for adapting virtual machines (VMs) for use in a managed system. This process can be, for example, similar to or a variation of the methods described here.

Another embodiment of the present invention provides a system for adapting virtual machines (VMs) for use in a managed system. The system functionality can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF THE INVENTION

Figure 1:
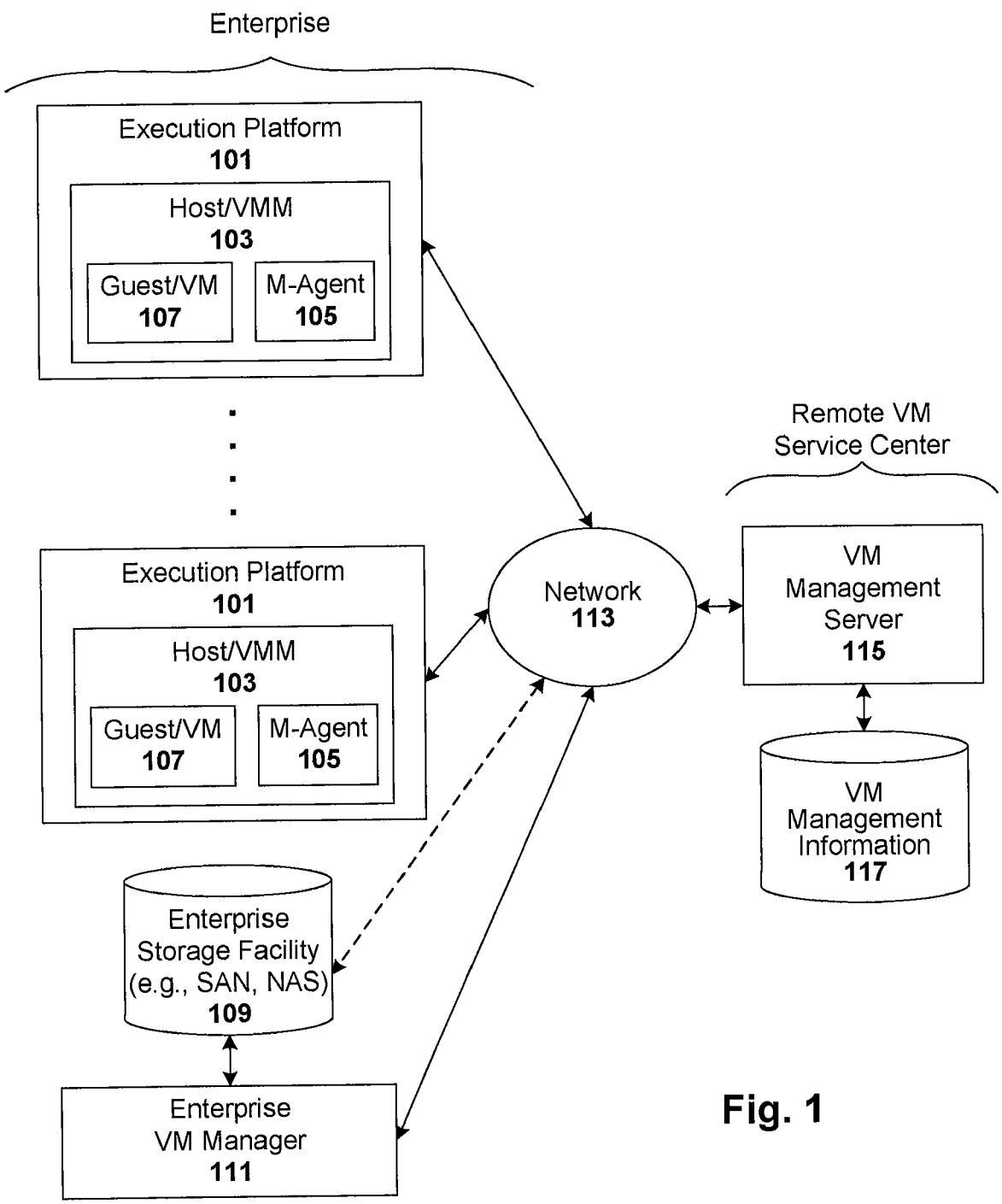
FIG. 1 illustrates a virtual environment configured in accordance with one embodiment of the present invention.

Techniques are disclosed for controlling and managing virtual machines and other such virtual systems. Traditional VMM/host environments employ the concept of admission control, which is quantitative in nature, in that VMs are only allowed to execute if there are enough resources (e.g., memory, swap space and bandwidth) for the VM to execute and run. One technique described herein is qualitative, in that VM execution approval is based on compliance with various policies, such as those regarding one or more of VM content, VM characteristics, execution context (e.g., production vs. test), change management, configuration management, asset management, version control, security management, license management, and resource management. These policies can be stored in a single or multiple locations. They can be contained in files, databases, directories, repositories, or other external policy stores, such as a CMDB, inventory database, or version control system. The techniques can be employed to benefit all virtual environments, such as virtual machines, virtual appliances, and virtual applications. For ease of discussion herein, assume that a virtual machine (VM) represents each of these environments.

General Overview

An effective way to manage management information associated with a VM is to create a new, resilient location to store the management information. This location can be attached to the VM or within the VM itself, in accordance with one embodiment of the present invention. Creating a new virtual partition or disk inside the VM provides an ideal location that will survive transportation, conversion etc and can even be used for introspection from the VM itself, as will be explained in turn. Such a virtual partition or disk is referred to herein as a systems management partition (SMP). This SMP travels with other VM disks/partitions, such as the operating system, applications, and data drives. Conversion, migration, and transformation utilities can be used to transport the SMP transparently, with such utilities being unaware that the SMP is for VM management. The VM management information can be stored across executions and vendors.

The management information generally includes relevant metadata about the VM contents, which is above and beyond metadata about the infrastructure necessary to start or instantiate the VM (e.g., how many CPUs it needs or the type of architecture it runs on, for example x86). As is known, there are various types of metadata, including logical and physical metadata. Physical metadata relates to the actual location of a data item and the characteristics of that item's storage system. Physical metadata includes, for example, data item size, times when the data item was accessed/modified, and data item access permissions. Logical metadata describes the contents of a data item or collection, independent of that data's actual location. Logical metadata includes, for example, a description of what the data item represents (e.g., VM transformation log), provenance information (e.g., the name and description of a data item's creator or modifier), and other information that allows the data to be interpreted. In addition, replication metadata refers to information that describes the relationship between logical data identifiers and one or more physical instances of the data. The management information can also include historical VM metadata (e.g., uptime/downtime, crashes/blue screens) or time-based VM metadata (e.g., VM to expire after X days, or do not run VM after mm/dd/yyyy), historical performance data (e.g., number of transactions and/or jobs by VM), historical VM system log, and historical VM event log information. Such historical information can be used in a system management scheme to improve user experience as well as overall system performance and efficiency. For instance, historical use data for a particular VM may indicate, for example, what execution platform that VM performs best (or worst) on based on the number of crashes or abrupt terminations, or what operator has the best (or worst) test performance using that VM, or what developer/user has the most (or least) run time on that VM, or how many times that VM has been copied or translated into new VMs, or how fast that VM executes to completion relative to other comparable VMs, or how that VM is only used during a certain time period and/or for a certain purpose, or how that VM always (or never) executes certain installed software, or how that VM is used in the same geographic location. Numerous such useful management data points can be monitored, extracted, and/or otherwise derived for use in a given system management scheme. In addition, note that historical use data can be collected from multiple SMPs and/or other management data storage locations. Further note that those SMPs and/or other management data storage locations can be all included in one enterprise (intra-enterprise historical use data collection) or from multiple enterprises (inter-enterprise historical use data collection).

In accordance with one embodiment of the present invention, management information includes metadata about the VM itself, VM logs, and VM events (e.g., such as creation, execution, snapshoting, templating), as well as metadata about the host and host environment (e.g., such as vendor, version, location, author, usage, licensing and other such pertinent host data). By storing such information within the VM container (or otherwise making such information accessible to the VM), it is possible to effectively track what a VM is doing and where it has been (similar to a flight recorder or "black box" that contains information about an airplane). The persistence and resilience of the SMP allows for the storing and accessing of security certificates, VM IDs or "tattoos", signatures (as will be explained in turn), and content metadata about the other VM partitions. The SMP can also be used as a staging area for installing additional content or agentry on the VM when the VM is executed. Management agents, software, settings, and content can be placed on the SMP pre-execution, or by a process running outside the VM and then later referenced by the VM during execution, startup, or shutdown to alter the VM.

When a VM is created, discovered, or registered, an SMP is dynamically added to the VM, in accordance with one embodiment. Templates and clones can also have the SMP added at the time of creation or later discovery. The SMP can be created, for example, by modifying a VM configuration file to reflect the new partition. Capturing the management information can be achieved in a number of ways, as will be apparent in light of this disclosure. For instance, information about the VM available in the host environment and vendor control files can be queried and the output saved as a file in the SMP. In addition, any host environment activity that touches the VM (e.g., starting, stopping, snapshoting, pausing, moving, cloning, creating a new VM, deploying a VM from a template, and other such activity) can be written to an activity log stored on the SMP. This host activity can be detected, for example, by an agent that registers for events in the host environment and then writes the event entry to the log on the respective VM's SMP. Information regarding the vendor, version, and technique used to create or manipulate the VM, as well as any other extracted metadata (e.g., physical and logical), can also be written to the SMP. The partition settings in the VM description can be set to force the changes to be committed to the VM when the VM execution is complete, regardless of the other partition settings.

The extracted management information (including any created, derived, and/or harvested metadata) about a VM can then be made available (e.g., on the SMP itself, in a dedicated enterprise storage area, and/or on a remote management server) for pre-execution processing (i.e., before the VM is initiated or any instruction contained in the VM is executed). In addition, the extracted management information enables the control of the execution of VMs across an enterprise based on what the content of the VM is (or isn't), and as well as the control of who can execute what VM, where the VM can execute, when it can execute, and why it is being requested. The fact the VM machine need not be running during this pre-execution processing provides many advantages. For example, the ability to determine that malware (e.g., viruses, rootkits, worms, and other such bad intent code) is present in the VM before the VM is executed allows for eradication before the toxic payload actually has any opportunity to execute, even just a few instructions. Knowing what software and services will be started upon VM activation can be used to prevent or delay executing of the VM to enforce policies and optimize licensing strategies.

Techniques described herein overcome numerous problems associated with conventional VM systems, to provide effective VM control and management. For example, the use of VMs in production environments typically involves operators using runbooks, scripts, and workflows to manage the VM startup (boot), shutdown, relocation, pause, etc. These processes whether manual, semi-automated, or automated explicitly reference VMs by name. When new versions of a VM are provided, the procedures and automation scripts need to be changed. Distributed systems, geographically separated datacenters, and backup sites create an additional set of challenges. The new VM needs to be distributed and all references to the new VM need to be changed at multiple locations, both in a coordinated fashion. In accordance with one embodiment of the present invention, VMs can be referenced or otherwise addressed using a unique tattoo that uniquely identifies the VM even though its explicit name (e.g., VM42) is renamed in a file system.

Also, when VMs are shutdown or quiesced, there are settings that govern whether any updates or changes made to the VM will be accepted or discarded. On one hand, changes may be discarded at shutdown creating false positives in reports and databases. On the other hand, changes that are inappropriate, unauthorized or destructive may be committed when the VM is shutdown. One embodiment of the present invention operates to manage the VM change or "evolution" process based on policy and behavior. In addition, one advantage of VMs is that they can be readily cloned and created. Templates can be created that allow a VM to be used as a model for many users of that VM. Another embodiment of the present invention is configured to automatically derive what changes are being made to copies, clones, and template-derived systems and evolve new VMs that embody those changes. In one such case, when multiple copies of VMs are executed, trends or patterns of VM usage are examined. New VMs are then created that embody changes based on analysis of that historical data.

Furthermore, many areas within IT organizations and vendors use virtualization and VMs to enhance, automate, and optimize their functional area. Such a VM usually operates in isolation and when the goal of its work is achieved, the VM is typically not passed on to other areas in the development to production lifecycle. Each area typically distills the components of their application or product, and packages the components using traditional packaging tools and formats. Each subsequent area then takes those packages and installs them on their systems, and then creates VMs from that resulting system. This process is repeated multiple times. Software vendors and integrators go through the same process in their software development, test, and release lifecycles and ultimately create installation packages that have to be installed by the customer. Such redundant or duplicative efforts are wasteful of enterprise resources. Another embodiment of the present invention is configured to manage a lifecycle where VMs are passed from vendor to customer or between departments, thereby reducing redundant efforts within an enterprise. Such an embodiment can be configured with various capabilities as discussed herein, including: the ability to verify a VM complies with policy before it is allowed to execute; the ability to create and adapt a VM in accordance with policy; the ability to provide reliable, resilient information about the VM (e.g., including information regarding its contents, performance, history, author, etc); the ability to verify the integrity of and authenticate a VM; the ability to inspect a VM without having to execute the VM; and the ability to register, dynamically translate, transport and decrypt a VM when needed.

Another embodiment of the present invention is configured to control and sometimes prevent VM execution in a given environment. This ensures that only enterprise-safe VMs are allowed to execute and update, and unsafe or unauthorized VMs are removed or disabled. In addition, unmanaged VMs (those not included in the managed system of the enterprise) will not be able to execute on managed execution platforms of the managed system. Likewise, unmanaged execution platforms (those not included in the managed system of the enterprise) will not be able to execute managed VMs. In short, only managed VMs and managed execution platforms can be used. Any other VM/platform combination will not function.

System Architecture

FIG. 1 illustrates a virtual environment configured in accordance with one embodiment of the present invention. VM management and/or control are enabled at both the individual VM level and the system level. As can be seen, this example system includes an enterprise communicatively coupled to a remote VM service center via a network 113. The enterprise can be, for example, a small company included in a single office suite or a large company having a multi-building campus over which the enterprise is spread. Likewise, the enterprise can be distributed over an even larger geographic area (e.g., regional, national, or international). Alternatively, the enterprise can be a home-based network.

The enterprise in this example embodiment includes an enterprise storage facility 109, an enterprise VM manager 111, and a number of computing environments, generally referred to as execution platforms 101. Each execution platform 101 can be implemented, for example, as a general purpose computer (e.g., desktop, laptop), server (e.g., file, application, email, and/or web servers), or special-purpose computer appliance (e.g., gateway or network interface, firewall, set-top box). Alternatively, or in addition to, an execution platform 101 can be implemented as a mobile communication device (e.g., cellular or satellite telephone, personal digital assistant, smartphone) or a GPS system (e.g., vehicle or personal navigation).

Each execution platform 101 includes a host or virtual machine monitor (host/VMM 103) running on that platform. The host/VMM 103 can be implemented with conventional or custom technology, so as to allow a virtual machine (guests/VM 107) to run therein. Each guests/VM 107 can be configured to carry out some specific function or set of functions (as typically done), and is further configured with a systems management partition (SMP) for storing the VM management information, as will be discussed in turn. Also running in the host/VMM 103 is a management agent (m-agent) 105. In alternative embodiments, the agent 105 can be implemented outside the host/VMM 103, so that it executes directly on the execution platform 101. In either case, the agent 105 is programmed or otherwise configured to provide access to the SMP of the guests/VM 107, and to provide management and control functions as described herein. The management agent 105 will be discussed in more detail with reference to FIGS. 2a-c.

The enterprise VM manager 111 can be implemented, for example, as a network computer appliance or enterprise server that is programmed or otherwise configured to provide VM management and control functions as described herein. In particular, the enterprise VM manager 111 can optionally be used to carry out the functionality of the management agents 105 for each of the deployed guests/VMs 107. The enterprise VM manager 111 can access the enterprise storage facility 109 to obtain, for example, copies of the guests/VMs 107 themselves and VM management information for carrying out the management and control functions. The enterprise VM manager 111 can also be configured to carry out a digital rights management (DRM) scheme (e.g., for monitoring and tracking license usage of host applications, content, and/or the guests/VMs 107 themselves, and ensuring licensing obligations are satisfied). In another embodiment, the enterprise VM manager 111 and the storage 109 can be implemented with a CMDB. The enterprise VM manager 111 will be discussed in more detail with reference to FIGS. 2a-c.

The remote VM service center includes a VM management server 115 that can be implemented with conventional or custom server technology, so as to provide VM management and control functions as well as access to VM management information 117 as described herein. The VM management information 117 can be stored in any number of storage facilities (e.g., object-oriented or relational database, or an indexed look-up table). Many server and storage schemes can be used, depending on factors such as the amount of information 117, as well as desired access speeds and query/ response complexity. The VM management and control functionality, as well as example structures of the VM management server 115, will be discussed in further detail with reference to FIGS. 2a-c.

Note that, just as with the enterprise VM manager 111, the VM management server 115 is optional, depending on the desired management and control scheme. In particular, VM management and control can be implemented at the guest/VM 107 level (e.g., via SMP agentry), the host/VMM 103 or platform 101 level (e.g., via m-agent 105), the enterprise level (e.g., via manager 111), or at the remote network level (e.g., via server 115). Likewise, any combination of these management sites can be employed to carry out various portions of the management and control scheme, as will be apparent in light of this disclosure.

As previously explained, the VM management information 117 generally includes any information that can be used in managing and/or controlling guests/VMs 107 of the enterprise, and includes, for example, both physical and logical metadata such as information about each guest/VM 107 (e.g., vendor, version, content, structure, activity logs, access permissions, authorized users, and technique used to create or manipulate the guest/VM 107) and information about each host/VMM 103 environment (e.g., OS, file system, applications and executable content, licensing data, and control files). The VM management information 117 may further include policies (e.g., security compliance rules such as security software and patches that are required prior to execution of a guest/VM 107, and licensing requirements to prevent use of unauthorized software) that apply to each guest/VM 107 and/or host/VMM 103, so that enforcement of those policies can be carried out prior to executing the VM. For instance, such enforcement may occur after a VM start request is received and prior to executing the target VM in response to that VM start request. Alternatively, such enforcement can be made prior to executing the target VM but independently of any start request (e.g., such as in the case where bulk compliancy testing is carried out on a plurality of VMs being introduced into a managed system). The VM management information 117 may further include copies of the guests/VMs 107, and well as any DRM data (e.g., number of available licenses for a given application and number of those licenses currently in-use) associated with those guests/VMs 107.

The network 113 can be any type of communications network, such as a local area network (e.g., intranet), wide area network (e.g., cable networks, Internet), cellular or satellite network, or some combination thereof. Alternatively, the network 113 can be implemented with direct connections between each execution platform 101 and the VM management server 115, and/or direct connections between each execution platform 101 and the enterprise VM manager 111. In general, the execution platform 101, the enterprise VM manager 111, network 113, and VM management server 115 may be in communication via any type of wired and/or wireless connections, using a wide variety of communication protocols and transmission techniques (e.g., TCP/IP, HTTP, FTP, TDMA, CDMA, HTTPS, SFL), security schemes (e.g., VPN, encryption), encodings or formats (e.g., XML, HTML), and inter-network interfaces, as needed to allow for desired communication.

As previously explained, enabling a virtual environment typically involves getting a host/VMM 103 running on a execution platform 101 and then allowing a VM (such as a guest/VM 107) to run in that environment. The hosts/VMMs 103 are constrained by hardware and instruction set architectures, and each guest/VM 107 can be initially prepared for each vendor-specific host environment, as conventionally done. In particular, the guests/VMs 107 are typically derived from physical machines that are then converted into VMs via a process of physical-to-virtual conversion, or P2V. The guests/VMs 107 can also be created by installing software on the guest directly, where the installation software believes it is installing on a physical machine, when in fact it is installing on a VM. There are a number of software products and utilities that help create and promote proliferation of VMs (e.g., such as products from Akimbi™, PlateSpin™, VMware®, and others). Once a guest/VM 107 is created, it can then have a systems management partition (SMP) installed as discussed herein, in accordance with one embodiment of the present invention. The SMP can be used for storing the VM management information for that particular guest/VM 107, as well as management and/or control agentry. An example SMP generation process is discussed in further detail with reference to FIGS. 2a and 3. The guests/VMs 107 themselves can be stored (e.g., in storage facility 109 and/or database 117) as files in any number of formats (e.g., virtual machine format of one or more vendors), or as clones and templates of model virtual machines previously made.

In one embodiment, each host/VMM 103 can have its own vendor-specific proprietary format for storing the guest/VM 107, clones, and templates on the enterprise storage facility 109, which can be, for example, a file server, NAS (network-attached storage), SAN (storage area network), or other suitable storage mechanism (e.g., intranet, removable drive, CD, DVD, tape, USB stick, etc). The enterprise storage facility 109 may also store management information for the guests/VMs 107, as well as management and/or control agentry (just as that information can be stored at the remote VM service center). Thus, the VM management information, as well as any management and/or control agentry can be stored in any one or combination of places within the virtual environment (on an SMP of a guest/VM 107, on the host/VMM 103 or platform 101, in the enterprise storage facility 109, and/or in the VM management information database 117).

In order to execute a guest/VM 107, only an available host/VMM 103 and read access to the files(s) representing the guest/VM 107 (e.g., referenced by an explicit file name or logical file name) are required. In an enterprise environment such as that shown in FIG. 1, many different departments and groups have their own hosts used in development, testing, QA, support, documentation and other areas. A guest/VM 107 can be passed between groups or accessed from a shared location on the enterprise network such as enterprise storage facility 109. A guest/VM 107 can also be emailed, as many are typically implemented with just one or two files contained in virtualized machine files and parameters.

Although multiple execution platforms 101 are shown networked to a remote VM service center, other embodiments may include a single execution platform 101 configured with a guest/VM 107 and a management agent (m-agent) 105 that are executable on a host/VMM 103, as will be discussed in turn. In addition, some embodiments may include other and/or different modules and functionality. Likewise, other embodiments may lack modules and functionality described herein and/or distribute the described functionality among the modules in a different manner (e.g., storage facility 109 can be integrated into manager 111, and/or storage 117 can be integrated into server 115).

Management Module

Figure 2A:
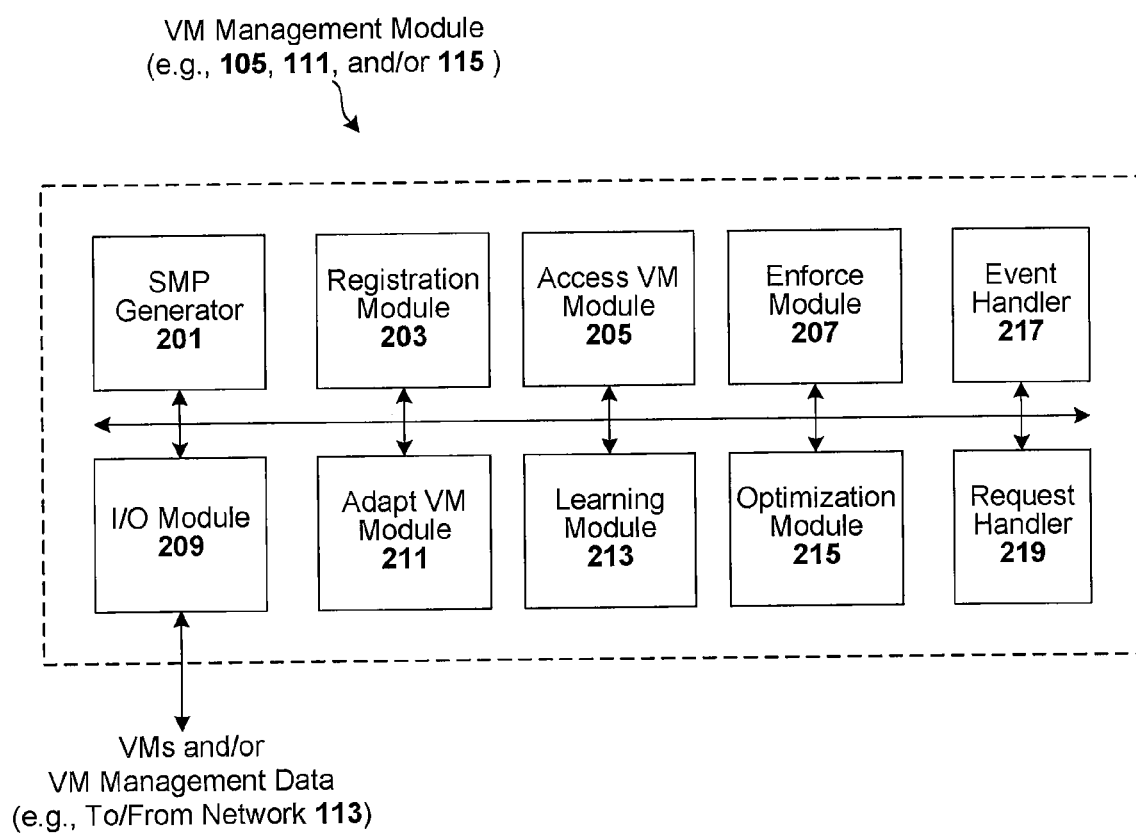
FIG. 2a illustrates a VM management module configured in accordance with an embodiment of the present invention.

FIG. 2a illustrates a VM management module configured in accordance with an embodiment of the present invention. As previously explained, the functionality of this module can be implemented, for instance, as the management agent 105, as the enterprise VM manager 111, or on the VM management server 115, as discussed with reference to FIG. 1. Further note that the functionality illustrated in FIG. 2a can be distributed among the management agent 105, enterprise VM manager 111, and/or VM management server 115.

In this example embodiment, the VM management module includes an SMP generator 201, a registration module 203, an access VM module 205, an enforce module 207, an event handler 217, an I/O (input/output) module 209, an adapt VM module 211, a learning module 213, an optimization module 215, and a request handler module 219. Each of these modules can be implemented in software. However, other embodiments may be implemented in hardware (e.g., gate-level logic) or a combination of hardware and software (e.g., microcontroller with embedded routines for carrying out the particular functions as discussed herein), if so desired.

Figure 3:
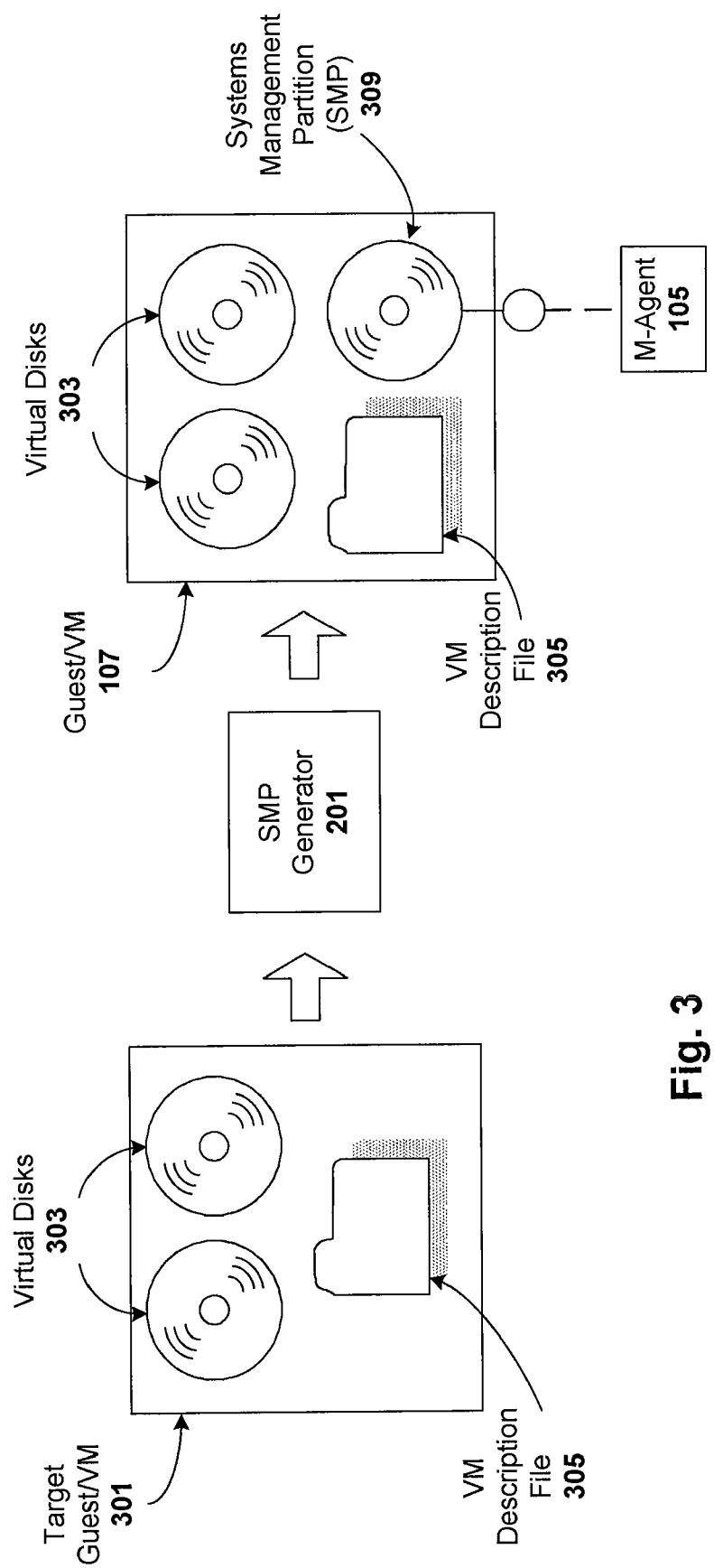
FIG. 3 illustrates a virtual environment configured with a management partition in accordance with one embodiment of the present invention.

The SMP generator 201 is programmed or otherwise configured to dynamically add an SMP to a guest/VM (thereby producing a guest/VM 107). This SMP generation process can take place, for example, when the VM is created, discovered, or registered. Likewise, templates and clones can also have the SMP added by generator 201 at the time of creation or later discovery. In more detail, a VM typically has a configuration file that can be modified to add the SMP. In one particular embodiment, the SMP generator 201 is configured to make this modification. For instance, in a VMware® environment, the VMX file (which describes the VM and all of its hardware including drives) can be edited by the SMP generator 201 to add the SMP. Similar files and/or commands also exist in other VM vendor environments (e.g., Microsoft® Virtual Server, Xen™, Linux® VServer™, coLinux™, etc), so as to allow for the addition of the SMP. The SMP generator 201 can be configured to operate with a number of different vendor environments, configuration files, and/or command sets. Alternatively, the SMP generation process can be carried out manually, if so desired. The SMP is not bootable and can either be hidden to the guest/VM 107 during execution or available to the guest/VM 107 in a limited fashion (e.g., read only). In one particular embodiment, the format of the SMP is FAT32, which allows for easy mounting from inside or outside of the guest/VM 107, from both Windows® and Linux®. Other drive formats can be used as well, depending on factors such as the underlying OS and desired mount/unmount complexity (e.g., HFS for Macintosh® systems). FIG. 3 illustrates a virtual environment configured with an SMP, in accordance with one embodiment of the present invention. As can be seen, a target guest/VM 301 is processed by the SMP generator 201 to produce a guest/VM 107. Within the guest/VM 107 (as well as the target guest/VM 301), there are one or more virtual disks 303 and one or more VM description files 305 (which describes the VM and the hardware it virtualizes, as well as some optional files like system snapshots of the VM at various stages of processing). There may also be a delta, difference, and undo/redo files for changes that are not committed to the VM virtual disks 303. After processing by the SMP generator 201, the guest/VM 107 further includes the SMP 309, which can be used for storing management information as well as agentry for managing and controlling the guest/VM 107. Access to the SMP 309 is provided by the m-agent 105.

The registration module 203 is programmed or otherwise configured to register VMs (such as guests/VMs 107) that will be used in a managed system according to an embodiment of the present invention. In one such case, the registration module 203 operates to register both logical and physical names of a VM, and to then transfer the VM bits to a file server repository (e.g., storage facility 109 or database 117). The registration module 203 may also be configured to translate the VM to any or all target host environment variants (e.g., Microsoft® Virtual Server, VMware®, Xen™, Parallels, etc), and to transfer those variants to the repository as well. The registration module 203 may also be configured to compress and/or encrypt the VMs (e.g., using conventional or custom compression/encryption techniques), if so desired. The registration module 203 may also be configured to transfer the VMs to their intended deployment destinations, as part of a pre-caching or staging scheme. Such pre-caching/staging can be based on, for example, historical use statistics and VM functionality (e.g., VMs that perform function X are historically requested for use on node ten of enterprise network). The historical use data can be stored, for instance, at storage facility 109 or database 117 and exploited by VM manager 111. The registration process carried out by module 203 is discussed in further detail with reference to FIGS. 5 and 6.

The access VM module 205 is programmed or otherwise configured to access stored VMs (such as guests/VMs 107) and make them available for use in a managed system according to an embodiment of the present invention. In one such case, the access module 205 is configured to implicitly request a VM via logical name, which is resolved into an explicit name. The explicit named VM is then looked-up to find source location(s) to get the physical VM bits. The acquired VM bits are then transferred to, or directly referenced by, the target destination. That destination can be, for example, a particular host/VMM 103 (or a set of hosts/VMMs 103 to which the acquired VM is copied) or to a cache or other designated storage location in which the VM can be stored or effectively staged for subsequent use. The access module 205 may also be configured to decompress and/or decrypt the VM (e.g., after transfer) using techniques complementary to any compression/encryption techniques used when storing/registering the VM, if applicable. The access module 205 may also be configured to translate the VM to various target host environment formats (e.g., Microsoft® Virtual Server, VMware®, Xen™, Parallels, etc), assuming those VMs have not been pre-translated (e.g., at the registration process). The acquisition process carried out by module 205 is discussed in further detail with reference to FIG. 7.

The enforce module 207 is programmed or otherwise configured to enforce a VM compliance scheme in a managed system according to an embodiment of the present invention. In one such case, the enforce module 207 is configured to execute policy-based checking of the VMs, as well as their respective hosts (such as host/VMM 103) and/or the requester. For instance, the enforce module 207 can be configured to check if a guest/VM 107 is properly licensed, and/or if the target host has the proper security software and patches installed, and/or to check if the requestor has access permission to use the guest/VM 107. The context and time of the request can also be checked for policy compliance to enforce policies regarding execution windows (e.g., M-F, 9-5) and intended uses (e.g., production vs. test). The enforce module 207 may also be configured to call or otherwise execute plug-ins to assist in the enforcement of the compliance scheme. Further note that the enforce module 207 may be configured with exceptions to various policies (e.g., administrator level access may be exempt from policy or certain files known to be good may be excused from the virus scanning process). The enforce process carried out by module 205 is discussed in further detail with reference to FIGS. 8a-8d.

The adapt VM module 211 is programmed or otherwise configured to adapt a non-compliant VM (such as a guest/VM 107) into compliance in a managed system according to an embodiment of the present invention. Thus, the enforce module 207 applies the policies and detects non-compliances, and the adapt VM module 211 makes the changes necessary to bring the VM into compliance. In one such case, the adapt VM module 211 is configured to adapt a non-compliant VM into compliance by making changes to the VM, such as direct manipulation/insertion of files, parameters, settings, and/or data into the VM. The adapt VM module 211 may also be configured to call or otherwise schedule other agents or processes to correct non-compliances. Example non-compliances that can be fixed by the adapt VM module 211 include missing security software (e.g., install virus scanning software, install security patches to the host OS), bug fixes and hotfixes, configuration (e.g., require certain user-configurable security settings, such as firewall level of medium or higher), and licensing issues (e.g., removal/flagging of unauthorized or bootleg software and DRM conformance based on number of available licenses). There are also non-compliances not contained in the VM which can be addressed by the adapt VM module 211, such as the registration of the VM in a CMDB or Asset Management database or integration with a license manager or server to acquire appropriate licenses for the execution. The adapt process carried out by module 211 is discussed in further detail with reference to FIG. 9.

The learning module 213 is programmed or otherwise configured to learn which VMs (such as guests/VMs 107) require what adaptations in a managed system according to an embodiment of the present invention. In one such case, the learning module 213 is configured to derive changes made during the adapt process (e.g., just after compliance is satisfied), and to capture those changes into a profile database (e.g., stored on SMP 309 of guest/VM 107, or in the storage facility 109, or in database 117). Likewise, changes made to the VM since its startup can be captured. Such captured data provides insight into more efficient VM management. For example, such data can be analyzed to detect that certain service packs are reapplied every time (not committed) a particular guest/VM 107 is used. Likewise, software that is consistently re-installed or removed during each VM use session can be identified. Such learning enables optimization, which can reduce repetitive or consistent adaptations that can be permanently integrated into a VM. The learn process carried out by module 213 is discussed in further detail with reference to FIG. 10.

The optimization module 215 is programmed or otherwise configured to optimize the VMs (such as guests/VMs 107) in a managed system according to an embodiment of the present invention. In one such case, the optimization module 215 is configured to analyze the changes detected during the learning process, and to suggest and/or derive optimized variants of the VM. For example, the optimization module 215 may be configured to derive a new (optimized) VM without applications that were installed, but are never or rarely executed (thereby saving licenses for other uses, in accordance with a given DRM scheme). Likewise, a patch or security update that is consistently installed during adaptation of a VM can be permanently installed (committed) for that VM. The optimization process carried out by module 215 is discussed in further detail with reference to FIG. 10.

The event handler 217 is programmed or otherwise configured to provide VM host (such as host/VMM 103) and utility integration by logging events that affect a VM (such as a guest/VM 107) in a managed system according to an embodiment of the present invention. In one such case, various events (e.g., starts, stops, pauses, moves, conversions, clones, creations, deployments from a template, snapshoting, and other such activity) are captured, hooked, or otherwise intercepted by the event handler 217 and subsequently logged to the corresponding VM's SMP. For example, events for multiple hosts (e.g., VMware® host, Microsoft® host, Xen™ host) can be intercepted by the event handler 217 upon execution. Likewise, events for multiple utilities (e.g., VMware® VirtualCenter, PlateSpin™ PowerConvert) can be intercepted or otherwise forwarded to the event handler 217 upon execution. One example event handler 217 flow is for VM execution (starting and stopping VM), which is as follows:

a) Guest/VM 107 is powered on;
   b) Start event is sent to the event handler 217;
   c) Event handler 217 writes the start event to the SMP of the guest/VM 107;
   d) Guest/VM 107 is powered off;
   e) Stop event is sent to the event handler 217; and
   f) Event handler 217 writes the stop event to the SMP of the guest/VM 107.

Note that events can still be written to the SMP (as it is mounted or otherwise available via its host) even when the guest/VM 107 is powered off. Another example event handler 217 flow is for VM conversion from one format (e.g., VMware® to another format (e.g., Microsoft®), which is as follows:

a) Guest/VM 107 is converted from one vender format to another;
   b) Convert event is sent to the event handler 217;
   c) Event handler 217 writes the convert event to the SMP of the pre-conversion guest/VM 107 (e.g., effective entry: "converted to Microsoft® VM on Jan. 1, 1999"); and
   d) Event handler 217 writes the convert event to the SMP of the post-conversion guest/VM 107 (e.g., effective entry: "converted from VMware® VM on Jan. 1, 1999").

In this example, the conversion process is intercepted and logged. Note that once a request for conversion is detected, the new VM resulting from the conversion process can be initiated into a managed system via the registration process as discussed herein, for example, with reference to FIG. 6. Such event intercept-triggered registration can be employed for any type of VM translation, conversion, creation, and other such processes resulting in new VMs to be registered for use in a managed system (e.g., convert process=convert process+ registration process for new VM). Another example event handler 217 flow is for detection of a VM has been converted from one format to another (after the fact), which is as follows:

a) Guest/VM 107 is converted from one vender format to another (no convert event is sent to the event handler 217, as conversion utility is not hooked);
   b) Post-conversion guest/VM 107 is powered on;
   c) Start event is sent to the event handler 217;
   d) Event handler 217 reads the SMP of the post-conversion guest/VM 107, and learns that the guest/VM 107 was a VMware® VM at the last management control point;
   e) Event handler 217 writes the convert event to the SMP of the post-conversion guest/VM 107 (e.g., effective entry: "discovered as a Microsoft® VM on Jan. 1, 1999 from VMware® VM); and
   f) Event handler 217 writes the convert event to the SMP of the pre-conversion guest/VM 107 (e.g., effective entry: "converted to Microsoft® on Jan. 1, 1999").

In this example, the initial conversion process was not hooked (for what ever reason, such as not configured or intercept mechanism was temporarily suspended). Thus, the event handler 217 effectively detects that a conversion (from a VMware® VM to a Microsoft® VM) has taken place, and then logs the detected activity.

Figure 2B:
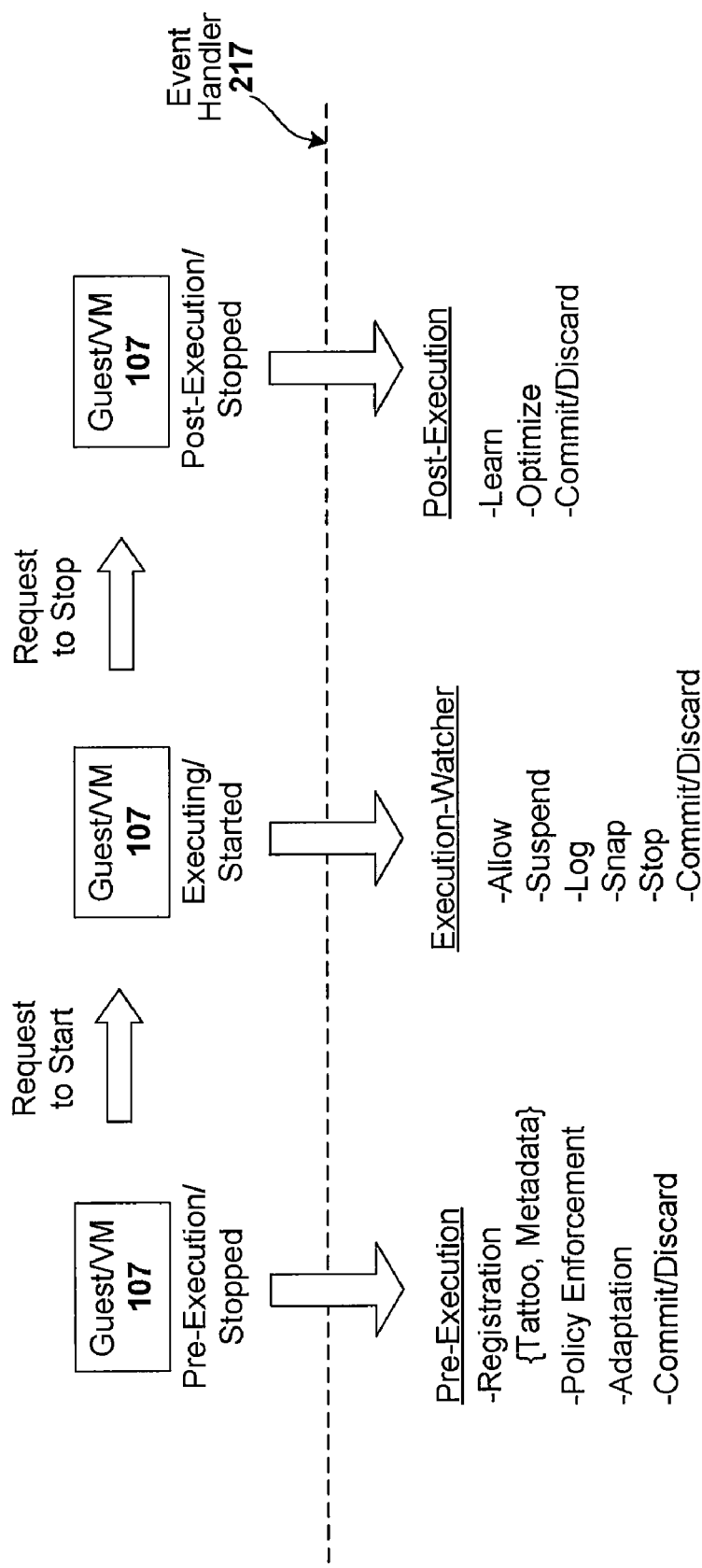
FIG. 2b illustrates different control points and actions that can be called by the event handler module shown in FIG. 2a, in accordance with an embodiment of the present invention.
Figure 2C:
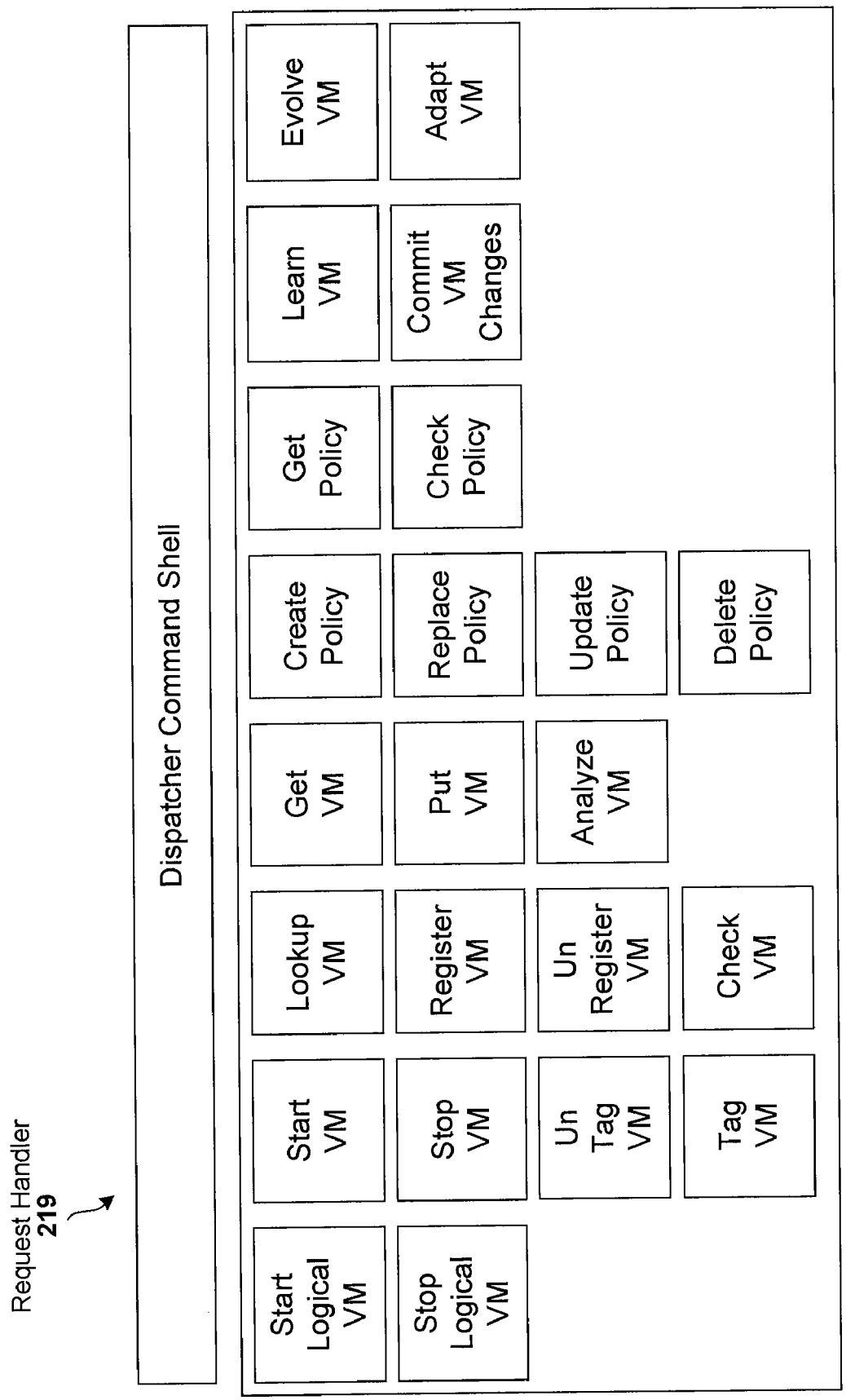
FIG. 2c illustrates a dispatcher command shell of the command interface module shown in FIG. 2a, configured in accordance with an embodiment of the present invention.

The event handler 217 effectively provides a control point to allow a program or process to intercept the start VM process (or other events, such as stop VM, pause VM, move VM, clone VM, create new VM, deploy VM from template) so there are several ways to force a request through. In one particular case, the event handler 217 intercepts file system requests for the target VM and does not return control until some desired action or actions have completed. FIG. 2*b* illustrates different control points and example actions that can be called by the event handler module 217, in accordance with an embodiment of the present invention. In the pre-execution mode, when a start request is received, it is intercepted by the event handler 217, and various pre-execution processes are called or otherwise verified, such as registration (e.g., if VM is not registered, then tattoo and metadata extraction processes can be engaged as discussed herein), policy enforcement (e.g., apply given policies to content of VM), adaptation (e.g., make necessary changes to VM to achieve compliance with policies), and commit/discard (e.g., permanently adopt changes, or mark changes as "do not commit"). In the execution mode, commands such as stop, pause, move, suspend, log, snap, and commit/discard can also be intercepted by the event handler 217, and various processes are called or otherwise verified, such as an "execution-watcher" module or monitoring program to ensure compliance is not compromised during execution. In the post-execution mode, when a stop request is received, it is intercepted by the event handler 217, and various post-execution processes can be called or otherwise verified, such as learn (e.g., identify what changes have been made to VM), optimize (e.g., adopt VM to permanently contain certain or all changes made), and commit/discard (e.g., permanently adopt changes, or mark changes as "do not commit").

In one particular embodiment, the execute/start intercept point is implemented by placing a wrapper in front of the start VM process so the event handler 217 gets called first and pre-execution processing can then be executed. After pre-execution processing, if ok to execute (e.g., VM complies with all content policies), then the event handler 217 directly invokes the start VM request. In another embodiment, the execute/start intercept point is effectively forced by changing the VM description file so the VM fails to start every time. The failure event is then reported to the event handler 217 by a hook, which initiates pre-execution processing. After pre-execution processing, if ok to execute (e.g., VM complies with all content policies), then the event handler 217 is configured to temporarily fix up the VM description file to allow normal start event flow. Other example VM management functions and their respective intercept event/control points include:

Metadata creation/VM discovery—hook into the VM creation, import and registration processes to initiate or queue requests to generate VM metadata as VMs are "discovered".

VM detection—Optionally intercept file system requests to the VM file system (e.g., VMFS for Vmware®) to detect creation of new VMs.

VM detection—Scan disks, directories, SANs, and media looking for VMs based on name (*.VHD, *.VMDK, etc) or inspect files (e.g., open and read them) looking for known VM formats.

Pre-execution control—Create an exit or method dispatch at strategic points in the VM start process on the host to force a compliance test (e.g., check VM itself or VM metadata against policies) and conditionally allow VM execution to proceed, be aborted or have corrective action taken.

The request handler module 219 is programmed or otherwise configured to replace native commands and interfaces, so as to effectively provide a homogenous command set and interface across multiple vender VM environments, in a managed system according to an embodiment of the present invention. In currently available virtualization products, there is a lack of control points and events necessary for effective VM management and control. For instance, there are no exits or events that are generated when someone requests a VM to start. By the time any event is generated, the VM is already executing. Thus, until such control points/events are provided in a given virtualization product, an alternative approach is necessary to acquire control at various critical points in the VM lifecycle. Request handler module 219 can be used for this purpose. The request handler module 219 can be implemented, for example, using a command line or shell (e.g., DOS command line), web services, APIs, and other such suitable interfaces. In one particular embodiment, request handler module 219 is configured with a dispatcher command shell as graphically illustrated in FIG. 2*c*. Note that the vertical grouping of commands is not intended to implicate any rigid structure or relationship between the commands. Other such command sets can be used as well, as will be apparent in light of this disclosure. The command shell effectively acts as a front-end wrapper that is invoked and performs whatever additional processing is required and also invokes the native VM command. The following pseudo code explains each of the commands in this example command set, in accordance with one embodiment of the present invention:

RegisterVM

Call AnalyzeVM (optional)

Tag Processing

TagVM (logical name)

Parse Logical Name into Discrete Tags, call TagVM for each

Add optional additional tags describing/characterizing this VM, call TagVM

TagVM

SQL PUT Row into Table VMTag with Columns VM (passed in) and Tag

UnTagVM

SQL Remove Row from Table VMTag with Columns VM (passed in) and Tag

UnRegisterVM

At end of life for VM

Harvest info (e.g., performance, uptime/downtime, usage, licenses) on the SMP before deregistering/destroying VM (historical use statistics and data for use in a macro-management scheme applied to the overall managed system)

UnTagVM(*) for this VM

Optionally remove from databases (e.g., asset management, CMDB, etc)

AnalyzeVM

Call MetadataExtractVM (e.g., various extractor plugins can be used)

Physical VM metadata

Logical VM metadata

Internal VM (e.g., does VM have proper content?)

External VM (e.g., is VM properly registered?)

VM host system may be similarly analyzed

Generate meta-metadata (system signature)
Call TattooVM
    Tattoo can be either via unique JD process (e.g., UUID/URN in UNIX) or can be assigned based on time, randomness, name
Place results of extraction in SMP and/or external database
PutVM
    Via FTP or HTTP, upload VM (passed in) into a data repository remembering its name in the repository; alternatively, don't actually move the VM, but ensure location where VM is registered is continuously network accessible and contains the definitive VM (e.g., URL/URI)
    SQL PUT into Table VMData with Columns passed in (VM, Type, etc) and data repository Name as Location, and Location (passed in) as OriginalLocation
StartLogicalVM
    Ask specified host via external interface (e.g., Web Service, API, Command line) to start a LogicalVM
    On specified host, LogicalVM is transformed to an actual accessible VM via Access logic
    Call StartVM
StopLogicalVM
    Ask specified host via external interface (e.g., Web Service, API, Command line) to stop a LogicalVM
    On specified host, LogicalVM is transformed to an actual accessible VM via Access logic
    Perform policy scan: if policy violation detected during execution, then disable commit
    Call StopVM
LookupVM
    Use Logical Name as a tag or use requested Tag(s)
    For each tag, do a SQL Query from Table VMTag storing each result set
    Compute the intersection of all the resultant sets to create a set of PhysicalVMs that match the Logical Name
    If more than one PhysicalVM is part of the result, algorithmically pick one (e.g., the first one in the list) or optionally prompt for selection or return list for further refinement
    Return the PhysicalVMs matched or a return code indicating that no matches were found
GetVM
    For specified VM and Type, do a SQL Query from Table VMData
    If no matching record found,
        Do a SQL Query from Table VMData searching for VM with any Type
        If Matching Records Found,
            Pick the First Matching Record
                In a temporary location, convert VM (e.g., via PlateSpin™ PowerConvert) from stored type to passed-in type
                Do a PutVM on the converted VM
                For specified VM and Type, do a SQL Query from Table VMData (on the record just added)
    If no matching record found, return a VM Not Found return code
    Return the matched VM
GetPolicy
    Do LDAP Queries based on any combination of Who (userid), What (vm), Where (host), When (time)
    Take the union of the resultant set of queries and use the result for the next step
    Convert the result into an XML Rules document (e.g., RuleML format) and return the XML document
CreatePolicy
    Five types
        Requestor/Userid (who)
        VM (what)
        Host (where)
        Time (when)
        Context (why)
    Access Control List/Discretionary Access Control List (ACL/DACL)
    Rules: (e.g., If Context=Prod and VMOS=WINDOWS then MUST CONTAIN SP2)
    Patterns: Allow(Prod*, *Websphere,*)
CheckPolicy
    Verify that VM is allowed (based on Requestor, Type, Location, Tattoo, etc)
    Verify that Host is allowed
    Verify that mandatory items (data, applications, patches, settings, etc) are on VM
    Verify that disallowed items (data, applications, games, settings, etc) are NOT on VM
    Optionally, verify that context/reason (Production, Test, etc) matches rules
    Optionally, verify that time window matches rules (e.g., VM only allowed to execute on $1^{st}$ shift when IT support is available)
    Verify VM is correctly and currently registered in CMDB/Change control system
    Verify starting this VM would not violate concurrency limit for this VM
    If any verification fails, return failure
    If all verifications pass, return success
AdaptVM
    For mandatory items in policy, add them to VM either directly (insertion) or indirectly (schedule task to add)
    For disallowed items in policy, remove them from VM either directly (removal) or indirectly (schedule task to remove)
    By default, do NOT register this changed VM nor store this VM centrally (e.g., via RegisterVM or PutVM)
    Record in the SMP the adaptations necessary and performed
    VM host system can be adapted per policy as well, if necessary
StartVM
    Call CheckVM
    On specified host, remember the original commit setting in SQL database for this VM and disable commits in actual VM
    On specified host, PhysicalVM is started (e.g., on ESX Server-vmware-cmd start command)
    Optionally for every PolicyInterval specified, call CheckVM
StopVM
    Call CheckVM
    Stop VM using host native command (e.g., on ESX Server-vmware-cmd stop command)
LearnVM
    After the VM stops or is suspended, the following operations are performed:
        BeforeVM is taken as the VM before any adaptation occurred
        AfterVM is taken as the stopped or suspended VM (pending commits via REDO log)
        BeforeVM and AfterVM are differenced against each other to learn what happened when the VM ran
        Examples of what may be learned:
            Which applications/services/programs were installed or uninstalled
            Which fixes/service packs were applied to what (e.g., OS, programs, services)

What applications/services/programs ran
  How much system resources were used (e.g., CPU vs. I/O vs. Network, etc).
Similar learning may be employed for the VM host system
CheckVM
The VM is checked for policy adherence
  This can be achieved using an agent running inside the VM and communicating with it to acquire metadata
  This can be achieved by suspending the VM and doing an external metadata scan
  Once the metadata is obtained by one of these methods, GetPolicy and CheckPolicy calls are made to determine adherence of VM to specified policy
VM host system can be checked for policy adherence using similar techniques
If Policy is violated, one or more of several (configured) actions may be performed Some examples:
  Suspend VM (e.g., vmware-cmd suspend)
  Set Commit=NO flag for VM (thus throwing away any changes)
  Notify Administrator (e.g., email, SNMP, message to console)
  Log
CommitVMChanges
Retrieve Commit setting stored during StartVM phase
If Commit=Yes, merge VM with REDO log
If Commit=No, discard VM changes
EvolveVM
Based on information determined in Learn phase and information specified in Policy and/or Configuration settings, create derivative VMs from the current VM
VM host system can be evolved as well, if necessary
Add these derivative VMs to the repository via PutVM
Examples:
  Create derivative VM with Windows® Service Pack 2 (SP2) applied
  Create derivative VM by removing application (e.g., SQL Server) that has not been used the last 10 times that this VM was run)
The following are example command sequences of request handler module 219 (comments for each command line are included in brackets/ . . . /):

Functionality associated with each of these commands is discussed in further detail with reference to FIGS. 4-10. Other commands and their underlying functionality will be apparent in light of this disclosure, such as ReplacePolicy, UpdatePolicy, and DeletePolicy.

An alternative to providing an interface layer for VM requests (such as request handler module 219) for transparently handling VM management capabilities is to configure the VM execution platform itself to intercept VM requests. As previously explained, such interception may be necessary if the control points necessary to process the requests are not provided by the host vendors. In one such particular embodiment, the host interception process also allows the current, existing VM requests (e.g., starting, stopping, pausing moving, cloning a VM, creating a VM, deploying a VM from a template, etc) issued by operators, scripts, and other interfaces to be transparently intercepted so additional processing can be performed, such as those described herein. The interception of the requests will vary by host vendor and platform. VM requests can be intercepted at both relatively high and low system levels. At a relatively high level, VM requests can be intercepted as early as possible in the host processing, before the VM is accessed or read, and the interception should be synchronous. At a relatively low level, the interception can be accomplished, for example, by replacing a shared object or dynamic link library, trapping the I/O call to access the VM, and/or inserting code into the VM host or open source host versions to redirect requests combined with recompiling the code with the appropriate control points added to the source.

Figure 2D:
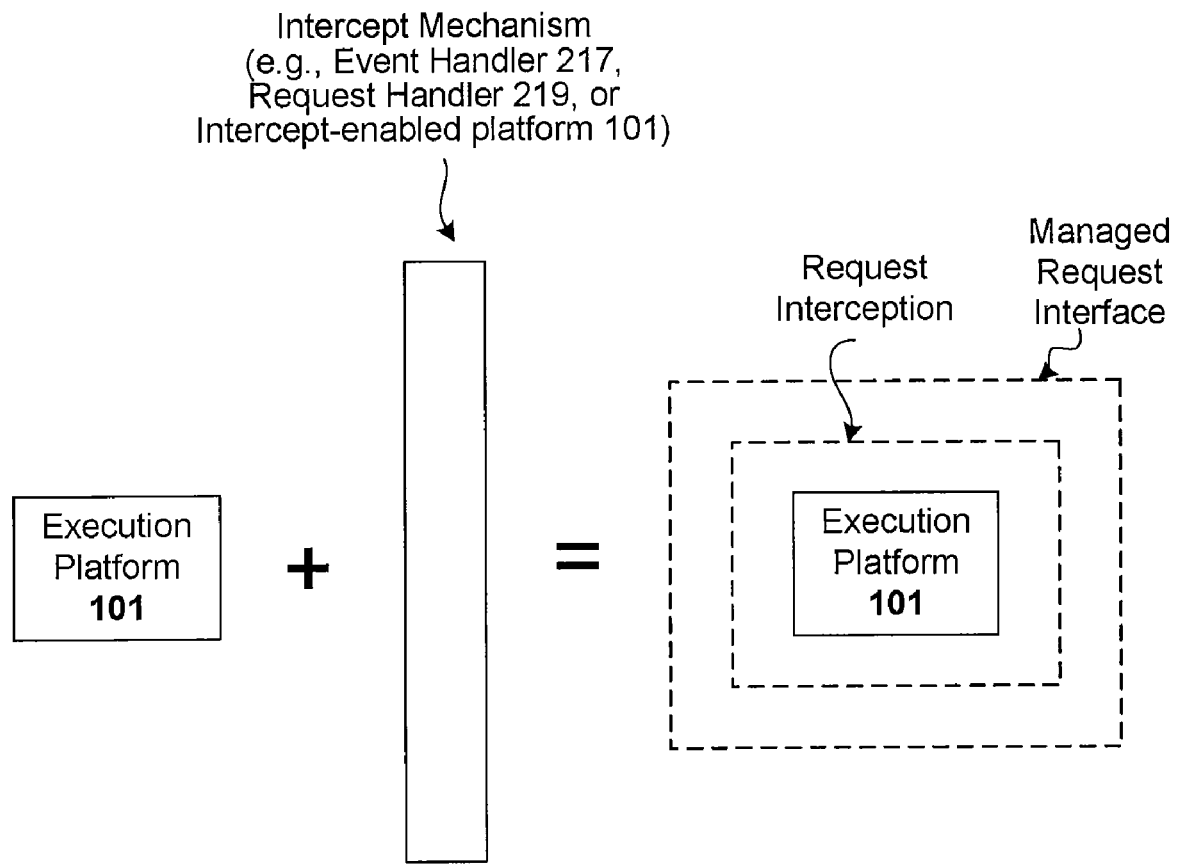
FIG. 2d illustrates request/event intercept mechanisms used to enable managed execution environments, in accordance with an embodiment of the present invention.

FIG. 2d effectively summarizes the various request/event intercept mechanisms used to enable managed execution environments, as discussed herein. In this example, the intercept mechanism enables request/event interception and provides a managed request interface. The intercept mechanism can be implemented, for example, as event handler 217, request handler module 219, or an intercept-enabled platform 101, as previously discussed. With such a mechanism in place, the platform 101 is enabled (either directly/within the host, or indirectly/outside of the host) to be a managed execution platform. It will be appreciated in light of this disclosure that the specific implementation of the intercept mechanism will vary based on the vender version and architecture of the execution platform.

```
Register:   RegisterVM lvm=prodwebspheresm,vm=VM42
            /register both logical name (prodwebspheresm) and the explicit name
(VM42)/
            PUTVM vm=VM42,type=vmware,location=...
            /store VM by explicit name, along with VM type in specified location/
Specify:    STARTLOGICALVM lvm=prodwebspheresm,host=host9
            /specify logical name of target VM and explicit name of target host/
            /other embodiments specify explicit name of target VM, if so desired/
Access:     LOOKUPVM prodwebspheresm
            /look-up logical name of target VM to get location of VM bits/
            GETVM vm=VM42
            /use explicit name to get target VM from location/
Enforce:    GETPOLICY vm=vm42
            /get policies for explicitly named VM/
            CHECKPOLICY vm=vm42.vmx,policy=vmpolicy87
            /apply given policy to explicitly named VM/
Adapt:      ADAPTVM vm=vm42,avm=vm42a
            /adapt explicitly named VM to match another explicitly named VM/
Execute:    STARTVM vm=vm42a.vmx,policyinterval=5minutes
Learn:      LEARN vm=vm42,redo=vm42redo
Commit:     COMMITVMCHANGES vm=vm42
Optimize:   EVOLVEVM oldvm=vm42,newvm=vm43,changes=prodrun
            REGISTERVM oldvm=vm42,newvm=vm43, lvm=prodwebsphere
```

The I/O module 209 is programmed or otherwise configured to provide input/output capability to the VM management module, so that each of the modules within can communicate with a guest/VM 107, data storage 109, data storage 117, and/or other entity on network 113 or otherwise accessible within the managed system. Furthermore, note that the modules within the VM management module may communicate with one another directly using, for example, conventional inter-process communication techniques.

VM Management and Control Process

Figure 4:
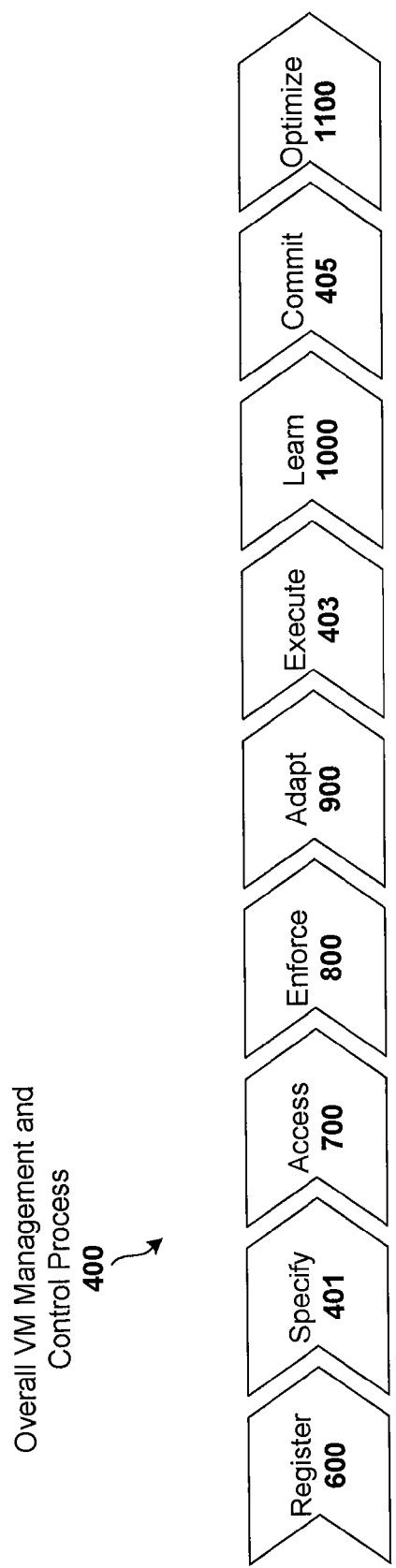
FIG. 4 illustrates an overall management and control scheme for a virtual environment, in accordance with one embodiment of the present invention.

FIG. 4 illustrates an overall VM management and control process 400, in accordance with one embodiment of the present invention. As can be seen, the overall process 400 includes a register process 600, a specify process 401, an access process 700, an enforce process 800, and adapt process 900, an execute process 403, a learn process 1000, a commit process 405, and an optimize process 1100. Each of these processes can be implemented in software, hardware, or some combination thereof, as previously explained.

The registration process 600 can be carried out, for example, by module 203. As previously explained, this module can be implemented in the m-agent 105, the enterprise manager 111, and/or the management server 115. In general, the process 600 operates to register VMs (such as guests/VMs 107) that will be used in a managed system according to an embodiment of the present invention. In one such embodiment, the registering one or more VMs for use in a managed system includes assigning a logical name to each VM and registering each VM and its location in a VM registry. Management data can also be extracted from each VM. In addition, each VM can be disabled for use outside the managed system. Process 600 is discussed in further detail with reference to FIGS. 5 and 6.

The specify process 401 can be implemented as typically done and can be carried out, for example, by a dedicated specification module or integrated into another process or processes, if so desired. In accordance with one particular embodiment, the specify process 401 operates to explicitly specify the name of a guest/VM 107 that is in the target format, and already co-located with the target host/VMM 103. The type of host/VMM 103 and the locale are implied by the guest/VM 107 requested. Alternatively, the specify process 401 can be configured to implicitly specify the name of a guest/VM 107 by using its logical name and the explicit target host/VMM 103 name on which that VM is located. Such a specification module or functionality can be implemented, for example, in the m-agent 105, the enterprise manager 111, and/or the management server 115.

The access process 700 can be carried out, for example, by module 205. As previously explained, this module can be implemented in the m-agent 105, the enterprise manager 111, and/or the management server 115. In general, the process 700 operates to access stored VMs (such as guests/VMs 107) and make them available for use in a managed system, according to an embodiment of the present invention. As will be appreciated in light of this disclosure, the accessed VMs can be explicitly disabled for use outside the managed system (e.g., by way of encryption or VM code modification). Note that the registration process 600 can occur independently and remotely from the access process 700. For instance, the registration process 600 can take place on a first network, while the access process 700 can take place on another network (e.g., which accesses registered VMs stored on the first network). Process 700 is discussed in further detail with reference to FIG. 7.

The enforce process 800 can be carried out, for example, by module 207. As previously explained, this module can be implemented in the m-agent 105, the enterprise manager 111, and/or the management server 115. In general, the process 800 operates to enforce a VM compliance scheme in a managed system, according to an embodiment of the present invention. In one such embodiment, process 800 includes getting compliance policies regarding a target VM, and prior to executing the target VM, applying the compliance policies against the target VM to determine if the target VM is compliant with the VM compliance scheme. Process 800 is discussed in further detail with reference to FIG. 8.

The adapt process 900 can be carried out, for example, by module 211. As previously explained, this module can be implemented in the m-agent 105, the enterprise manager 111, and/or the management server 115. In general, the process 900 operates to adapt a non-compliant VM into compliance in a managed system, according to an embodiment of the present invention. In one particular embodiment, the enforce process 800 and the adapt process 900 are components of the registration process 700 (e.g., where a number of VMs are registered, compliance tested, and adapted as necessary for subsequent access and use in a managed system). Process 900 is discussed in further detail with reference to FIG. 9.

The execute process 403 can be implemented as typically done and can be carried out, for example, by a dedicated execution module or integrated into another process or processes, if so desired. In accordance with one particular embodiment, the execute process 403 operates to execute the target guest/VM 107 in a requested host/VMM 103 environment. Resource management principles can be used to select an appropriate host/VMM 103, if so desired. In addition to this typical functionality, the process 403 may further include an "execution-watcher" functionality. In such an embodiment, the process 403 operates to periodically examine the running guest/VM 107. If the guest/VM 107 becomes non-compliant for any reason (e.g., based on policy), then process 403 can implement one or more remedial actions, such as log, stop, suspend, snap, and mark the guest/VM 107 as do-not-commit changes. Other remedial action may also be taken, such as virus scanning and removal, removal of unauthorized software, and configuration setting adjustments. Such an execute module or functionality can be implemented, for example, in the m-agent 105, the enterprise manager 111, and/or the management server 115.

In one example embodiment configured with execution-watcher functionality, prior to the VM starting (or resuming) to execute, process 403 operates to change the settings of the VM to create a transaction log (e.g., REDO file) and not commit changes; the commit setting in the managed system (e.g., set within module 105, 111, and/or 115 for FIG. 1) is set to its default value (e.g., do-not-commit or selective commit). Note that this change to VM settings can be done on-the-fly. This effectively takes the commit functionality from the execution platform and gives it to the managed system, so that no or otherwise selective committing can be carried out as desired. Once the VM is running, the execution-watcher checks (e.g., on a configurable time interval) that the VM is in policy-compliance. If not, remedial action can be taken (e.g., by operation of process 403 itself, or other processes of the managed system, such as the enforce process 800, adapt process 900, or learn process 1000, and/or commit process 405). Once the VM stops (or suspends), the managed system checks its commit setting and makes decisions to commit or not. If commit is decided upon, the managed system can then call a commit process (e.g., one of the vendor-supplied utilities or commit process 405) to commit the transaction log to the VM.

The learn process 1000 can be carried out, for example, by module 213. As previously explained, this module can be implemented in the m-agent 105, the enterprise manager 111, and/or the management server 115. In general, the process 1000 operates to learn which VMs (such as guests/VMs 107) require what compliance adaptations in a managed system, according to an embodiment of the present invention. Process 1000 is discussed in further detail with reference to FIG. 10.

The commit process 405 can be implemented as typically done and can be carried out, for example, by a dedicated commit module or integrated into another process or processes, if so desired. In accordance with one particular embodiment, the commit process 405 operates after execution is finished to permanently commit changes made to a guest/VM 107, or to discard those changes. In addition to this typical functionality, the process 405 may be configured to further include a selective commit control. In such an embodiment, if the post-execution VM content violates policy or is otherwise non-compliant, then process 405 can implement one or more actions, such as log, disable VM, mark the VM as do-not-commit changes, or prevent the changes from being committed (e.g., by deleting REDO/Diff file(s)). Process 405 may further be configured to partially accept changes made (e.g., by editing REDO/Diff file(s) to eliminate undesired changes, but keeping the desired changes, and then committing the desired changes). Such a commit module or functionality can be implemented in the m-agent 105, the enterprise manager 111, and/or the management server 115.

The optimize process 1100 can be carried out, for example, by module 215. As previously explained, this module can be implemented in the m-agent 105, the enterprise manager 111, and/or the management server 115. In general, the process 1100 operates to optimize the VMs (such as guests/VMs 107) in a managed system based on information provided by the learn process 1000 (e.g., where adaptations that are consistently made by the adapt process 900 each time a VM is run are permanently committed to that VM), according to an embodiment of the present invention. Alternatively, or in addition to, the process 1100 can operate to suggest and/or derive a variant of a target VM that permanently includes any desired change. Process 1100 is discussed in further detail with reference to FIG. 10.

One particular embodiment of the present invention can be used (e.g., by the cumulative operation of the register process 600, access process 700, enforce process 800, and adapt process 900) to protect against the execution of VMs on execution platforms not included in a given managed system. Likewise, such an embodiment can be used to protect against the execution of unregistered VMs in an execution platform included in a given managed system. In one such embodiment, the register process 600 makes a VM available by logical, abstract names and tags, and also disables or protects the VM by altering the VM in one of several ways. The VM can be encrypted and only a managed VM can request the decryption. Alternatively, or in addition to, the VM can have part of its VM control information or header manipulated so that only a managed execution platform can correct/reverse the manipulation. Note that an advantage of such manipulation over encryption is elapsed time and CPU necessary to decrypt a VM (e.g., some VMs are very large, in excess of 20 gigabytes, and the decrypt times could be long). Thus, the goal in accordance with one such embodiment is to have a managed VM that can only be executed on a managed execution platform. Any other VM/host combination will not operate (e.g., a managed host will not execute an unmanaged VM, and a managed VM cannot be executed by an unmanaged host).

VM Registration

Figure 5:
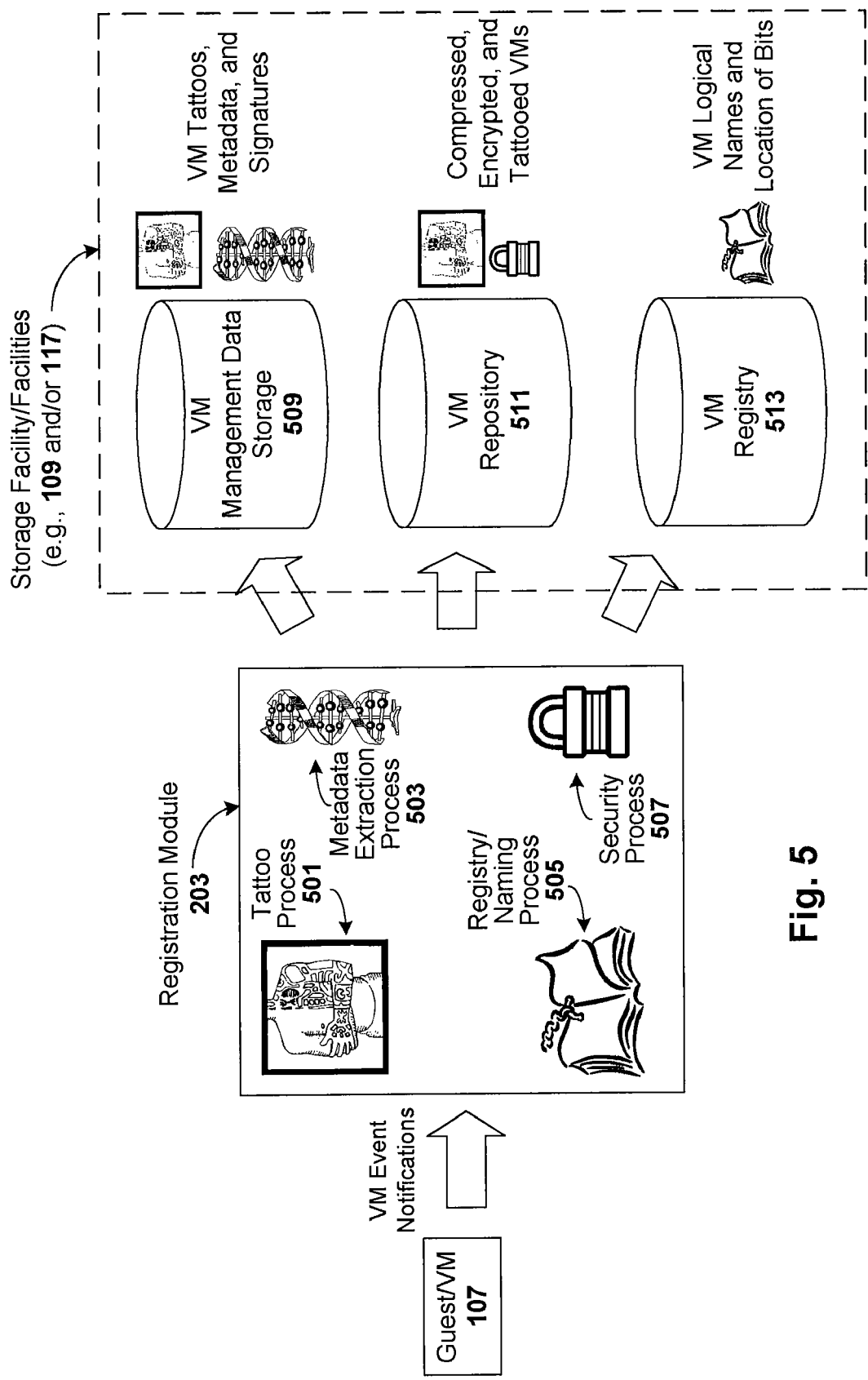
FIG. 5 illustrates a registration module and VM management data storage facility configured in accordance with one embodiment of the present invention.

FIG. 5 illustrates a registration module 203 and VM management data storage facility configured in accordance with one embodiment of the present invention. The VM management data storage facility could be implemented, for example, as the enterprise storage facility 109, VM management data database 117, or a combination of the two storages.

As can be seen, the registration module 203 of this example embodiment includes a tattoo process 501, a metadata extraction process 503, a registry/naming process 505, and a security process 507. Each of these processes can be implemented in software (e.g., C, C++), although other hardware and firmware embodiments will be apparent in light of this disclosure. The VM management data storage facility includes a VM management data storage 509, a VM repository 511, and a VM registry 513. These storages 509, 511, and 513 can be co-located or exist in geographically different areas. Module 203 can write data from the registration process directly to the storages 509, 511, and 513, or via a communications network, such as that discussed with reference to network 113.

The VM management data storage 509 is used for storing VM tattoos (guest/VM 107 identification mechanism) and VM metadata (details about the guest/VM 107) and signatures (based on physical, logical metadata, and/or content). The VM repository 511 is used for storing the actual bits of the VMs, such as guests/VMs 107. Note that the stored VMs can be compressed, encrypted, and/or tattooed. The VM registry 513 stores VM logical names with the location of the corresponding VM bits (within the VM repository 511, or some other reported location). The overall storage facility (as well as any of the individual storages 509, 511, and 513) can be implemented, for example, using conventional data storage and access technology. In one particular embodiment, storage 509 is implemented with a configuration management database (CMDB), and storage 511 is implemented as a SAN or file server repository, and storage 513 is implemented as UDDI (Universal Description, Discovery, and Integration) registry or an SQL database. Many suitable data storage/access choices are available. The metadata can be stored in any suitable form, such as XML or other such data structure or format.

At the time of guest/VM 107 creation, the registration module 203 receives a VM event notification (e.g., via an intercept mechanism as discussed herein) that a new guest/VM 107 has been created. The guest/VM 107 can be in any vendor format, such as VMware® ESX, GSX, Microsoft® Virtual Server, Xen™, Parallels). Note that other VM events, like starting, stopping, pausing, moving, registration, cloning, and deploying from a template, can be similarly hooked, intercepted, or otherwise detected to provide notifications. In general, notification of such events can be used as a trigger to interrogate the VM disk files (e.g., disks 303 and/or description file 305) as well as control information kept about the guest/VM 107 in the vendor specific locations (e.g., VMware—VMX file, Virtual Center repository). In the case where guests/VMs 107 are being copied or imported into a host environment, the storage facility where the guests/VMs 107 are kept can be scanned or monitored by the registration module 203 (or other modules) to detect new guests/VMs 107.

The tattoo process 501 is programmed or otherwise configured to generate a unique ID (a "tattoo") for each registered VM. The tattoo process 501 can be implemented, for example, using a unique ID process (e.g., UUID or GUID or other universal ID scheme). Alternatively, the tattoo process 501 can be configured to generate a unique ID based on time, randomness, and/or VM data. For instance, the tattoo process 501 can be implemented using hashing functions to generate the unique ID (e.g., MD5 of VM content+metadata), or random code generation processes. The result of the tattoo process 501 is a robust and universally unique ID for the VM. In the example shown, this ID or tattoo is stored in database 509 and can be used throughout the managed system to identify the VM, wherever it may be deployed. Other variations on the tattoo process 501 will be apparent in light of this disclosure, depending on factors such as the desired uniqueness of the ID and computation complexity. For instance, the generated tattoo may be based on a single layer of data or multiple layers (e.g., one hashing function operation, or multiple such operations using aggregations).

A VM tattoo can be used in a number of ways. One use is unique identification as it relates to clones, which are copies of the same VM but in different formats (e.g., Vmware®, Xen™, and Microsoft® versions). This cloning may occur, for example, during the access process 700, if a requestor needs a particular VM but in a format different than the one in the VM repository 511. A second use of the VM tattoo is genealogy/family tree type handling. In general, when a new VM is derived or evolved, the tattoo/ID of the VM from which it was derived is kept embedded in the new VM and a new tattoo is generated for the derived VM. Thus, each VM has embedded tattoos that indicate familial relations. Over time, this allows for a trace back thru related VMs, which may be helpful for a number of reasons. For example, if a VM is found to have some major problem (e.g., virus or wrong software), the embedded chain/tree of tattoos could be used to generate a list of potentially affected offspring VMs that were derived from the compromised VM. A third use of the VM tattoo is for uniquely identifying a VM even though its explicit name (e.g., VM42) is renamed in a file system. The internally stored tattoo can be used to verify the VM. A fourth use of the VM tattoo is a unique key in a database (e.g., CMDB, database 509, repository 511, registry 513, etc), as well as in logs, eventing, and other structures/actions where a unique ID is helpful, that uniquely identifies the VM, regardless of logical names, tags, physical file names, or VM formats.

The metadata extraction process 503 is programmed or otherwise configured to extract and/or create metadata from the VMs and/or host systems (such as guests/VMs 107 and hosts/VMMs 103) for use in managing the VMs. In accordance with one such embodiment, the first step in creating/extracting metadata is making the VM disk files (such as disks 303) available to process 503, which is configured to understand the disk format, the installed OS on the VM, and the semantics of the VM itself. Making the disks available is generally referred to as mounting the disks. Such mounting can be accomplished via utilities like vmware-mount by VMware®. Once a virtual drive/disk is mounted, then the metadata extraction process 503 (which may include one or more routines, such as a mounting routine, data mining/interrogation routine, and unmounting routine) interrogates the file system and reads any file or the directory information about the file. In one particular embodiment, the metadata extraction process 503 is configured to read several major drive types, such as NTFS for Windows®, FAT(12/16/32) for Windows®, ext2, ext3 for Linux®, HFS/HFS+/HFSX for MacOS®, BSD UFS/UFS2 for MacOS®, and other systems. Once the metadata extraction process 503 has read access to the disks, it can perform OS-specific metadata extraction. For example, on Microsoft® Windows® systems, extraction process 503 can read configuration files like *.ini files, application installation files like *.MSI, and user and account information and the system files (e.g., SYSTEM, USER, etc) that constitute the Windows® registry. On a Linux® system, the extraction process 503 can read the etc/config files, application installation files like *.RPM, etc/inittab indicating which applications will auto start, and other information kept in the etc/* files (such as etc/password). From these files, the extraction process 503 can determine what applications are installed, and which ones are automatically started when the system is booted. The process 503 can also see what accounts and users are defined, and can determine what system services/daemons are present and will be executed (e.g., DHCP, PXE, Active Directory, SAMBA, Apache Webserver, etc). The MBR can also be read by the metadata extraction process 503, to determine what OS and disk will be used when the system is booted. Note that the MBR is obtained outside of the normal file process because it is normally hidden to programs outside of the boot environment.

In one particular embodiment, the metadata extracted by process 503 includes both physical and logical metadata. The physical metadata maps to physical things on the VM disk, such as the file system. The contents of a file can be interrogated and processed physically without regard to what the file logically contains and a signature can be derived for the file (e.g., MD5). Logical metadata can be obtained by mapping a logical view to a physical file. For example, the Windows® registry is stored as a set of physical files on a VM disk. Inside the registry is information about which applications and services are automatically started when the system is started/booted. The metadata extraction process 503 is configured to be aware of the different parts of the registry and how to logically map the structure. Other metadata such as replication metadata, which refers to information that describes the relationship between logical data identifiers and one or more physical instances of the data, may also be created by the process 503. After all the appropriate VM disk information is obtained by the extraction process 503, the extraction process 503 operates to read the information kept in various host control files and database. In one such embodiment, the extraction process 503 is configured to extract information kept in the description files that each VM host vendor keeps about a VM. For instance, on a Vmware® host, this file is the VMX file. This file may include, for example, device information, author, date/time information, number of disks, disk sizes, etc. Such information can be extracted by the extraction process 503 and added to the collected metadata. The extracted/created metadata can be stored for subsequent interrogation or use without incurring the extraction/processing overhead (e.g., mounting, extraction, deriving/creation, unmounting) described above. For example, the extraction process 503 can store the extracted metadata externally in a database or directory, such as in the database 509. Alternatively, or in addition to, the process 503 can store the extracted metadata with the VM itself in the VM repository 511, or as a file or files on one of the existing VM disks (e.g., on a disk 303), or with the VM on a separate disk (e.g., on the SMP 309) within the VM. Other data can be stored as well (e.g., in database 509), such as intermediate signatures used to generate an overall signature, with all such signatures (e.g., initial, intermediate, and overall signatures) being available for subsequent use. The extraction process 503 could also be performed in real-time at the time of the execution request, but would incur some time delay due to the processing such as mounting and reading files.

As indicated above, the metadata extraction process 503 can be configured to generate signatures using the extracted physical and/or logical metadata. In one such embodiment, the metadata extraction process 503 operates to read files on each VM disk drive (such as disks 303), and then generates a content signature or signature for each and every file using a technique like MD5 or other hashing function. The signatures themselves can be stored in a data structure (e.g., tree structure reflective of the content) or file. The metadata extraction process 503 may be further configured to derive a whole physical system signature by performing an MD5 or similar on the data structure (or other aggregation of content signatures). The Master Boot Record (MBR) can also be read and captured into the signature generation process as well, if so desired. Alternatively, or in addition to, the metadata extraction process 503 can be configured to generate a signature for logical metadata extracted from the VM and/or host. The metadata extraction process 503 then stores the logical metadata signatures in a structure and generates a logical metadata system signature, using MD5 or some other hashing function. Such a process is useful for logical structures such as the Windows registry, which is hierarchical in nature. The metadata extraction process 503 can further operate to generate an entire system signature by combining both logical and physical system signatures, using MD5 or some other hashing function.

The registry/naming process 505 is programmed or otherwise configured to translate VM logical names to VM physical names (e.g., similar to a network DNS), and to store those names as well as the location (in repository 511) of corresponding VM bits in the VM registry 513. This registered location could be, for example, where the VM is sent after the registration process is completed, or the location where the VM is discovered. Thus, the VM registry 513 associates the VM logical and physical names with the location of the corresponding VM bits (within the VM repository 511, or some other reported location).

The security process 507 is programmed or otherwise configured to compress and/or encrypt the VMs prior to storing them in the VM repository 511, if so desired. In one particular embodiment, the security process 507 implements VM compression using the GZIP compression, and VM encryption using AES128 encryption. Complementary decompression and decryption techniques can be used when accessing the stored VMs for deployment. Other techniques can be used to secure or otherwise disable the VM against execution outside of a managed host environment (e.g., modifying first few line of VM code to effectively disable).

Figure 6:
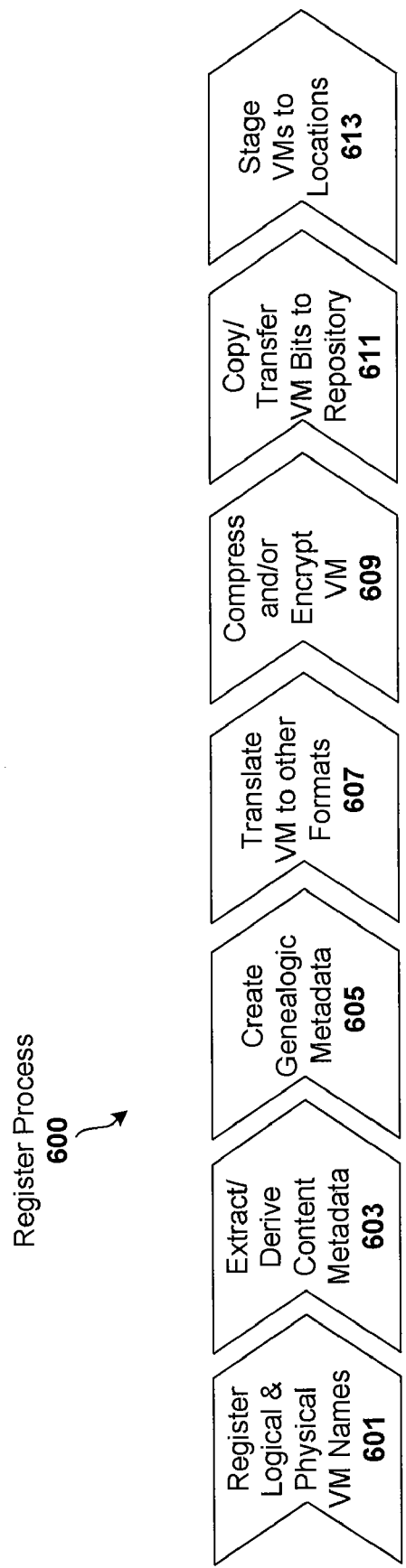
FIG. 6 illustrates a VM registration process configured in accordance with one embodiment of the present invention.

FIG. 6 illustrates a VM registration process 600 configured in accordance with one embodiment of the present invention. This process 600 operates on a newly created or newly discovered VM, which may be an original VM or VM copy. In any case, the VM being operated on by process 600 is generally referred to as the target VM, for purposes of this discussion.

The process 600 includes registering 601 the target VM in a VM registry (e.g., registry 513, such as a UDDI registry or an SQL database). In one particular embodiment, step 601 includes assigning a logical name or tag to the target VM (e.g., VMTag). Recall that the VM can later be implicitly requested via this logical name, which is resolved into an explicit name.

The process 600 continues with extracting and/or deriving 603 physical (e.g., file system, registry, etc) and logical (e.g., installed applications, started service) content metadata from the target VM, and creating 605 a VM tattoo or UUID for the target VM, as previously described.

The process 600 continues with creating 605 VM genealogy metadata. In more detail, and in accordance with an embodiment of the present invention, a VM's genealogy metadata indicates where the VM came from (so as to allow for tracing its existence back to some original VM) and what children and/or clones have been spawned from that VM. For instance, every time a VM is copied or translated, its genealogy metadata data is updated (e.g., effectively: "I am a copy (or derivation) of VM 42 which is a copy of VM 7, which is a copy of VM1"). A corresponding entry would be made in the genealogy metadata of each related VM (e.g., for VM1: "I was duplicated into VM7, which was duplicated into VM42"; for VM7: "I am a copy of VM1 and was duplicated into VM42"). In one particular embodiment, the same result is accomplished using VM tattoos, as previously explained. In more detail, when a new VM is copied, derived, or evolved, the tattoo/ID of the "parent" VM it was derived or cloned from is kept embedded in the new "child" VM. Also, a tattoo is generated for the child VM, and stored into both the child itself and the parent VM. Thus, the parent VM now has genealogy metadata indicating its children VMs, and the child has genealogy metadata indicating its parentage. Over time this embedded genealogy metadata provides a full family tree for the VM. Other event information can be maintained in the genealogy metadata as well, such as event dates and specific VM formats. As the registration process is used to initiate many new VMs into the managed system, such genealogy metadata can be readily created/added to the VM. For those VMs that are discovered (as opposed to created), there may not be a complete set of genealogy metadata (or simply none). In such a case, the target VM's genealogy may be detected or otherwise deduced from the target VM itself, as well as from other VMs that list the target VM in their respective genealogies. For instance, recall that the event handler 217 can effectively detect that a copying event has taken place (e.g., by reading the SMP of the post-event VM and reviewing management control points), so that particular copying event can be detected and logged. Such post-event detection can also be used in detecting or otherwise creating VM genealogy metadata. In another particular embodiment, a family ID can be computed using the VM genealogy metadata (e.g., via MD5) for all members of a particular VM family, because the VM genealogy or family tree for each VM will effectively be the same. For instance, assume an example family includes a parent VM (e.g., tattoo equals ABC), a first child VM (e.g., tattoo equals DEF), and a second child VM (e.g., tattoo equals GHI). Thus, when computing a family ID for any of these three related VMs, the tattoo values of ABC, DEF, and GHI will be processed (e.g., MD5 {ABC, DEF, GHI}) for each VM family member, thereby providing each VM with the same family ID (which will be unique to that particular family). Tracking VM family members (e.g., for purposes of recall and remediation, or other reasons) can be facilitated using this family ID. As will be appreciated in light of this disclosure, note that a "child" VM may be an exact copy (clone) or a derivative (partial clone) of its parent, and that a clone may eventually evolve to be partially or completely different than its parent.

The process 600 continues with translating 607 the VM to other formats (e.g., common variant target host formats used in a given managed system) using tools like PowerConvert apis from PlateSpin™, as well as similar conversion tools from Vmware® and Microsoft®. The translated VMs can also be registered and/or stored for immediate availability alongside the original VM in the VM repository 511. The process 600 continues with compressing and/or encrypting 609 the VM (e.g., GZIP compression and AES128 encryption, or other suitable compression/encryption techniques). Such compression/encryption can be used to ensure a secure and efficient transmission of the VM to its intended location.

The process 600 continues with transferring/copying 611 the VM files (typically in the form of bits (e.g., 8-bit bytes, 16-bit words, 32-bit long word, data blocks, packets, or other such digital expression) to a VM repository (e.g., repository

511, such as a SAN or file server repository). Alternatively, step 607 may be implemented in a more indirect way, by storing an address that points to a memory location where a "master" VM resides. As an alternative to 611, in addition to 611, the process 600 may further include staging 613 the VM to target host locations/domains (in anticipation of subsequent requests from those locations/domains) using standard transmission protocols like HTTP, HTTPS, and FTP.

VM Acquisition

Figure 7:
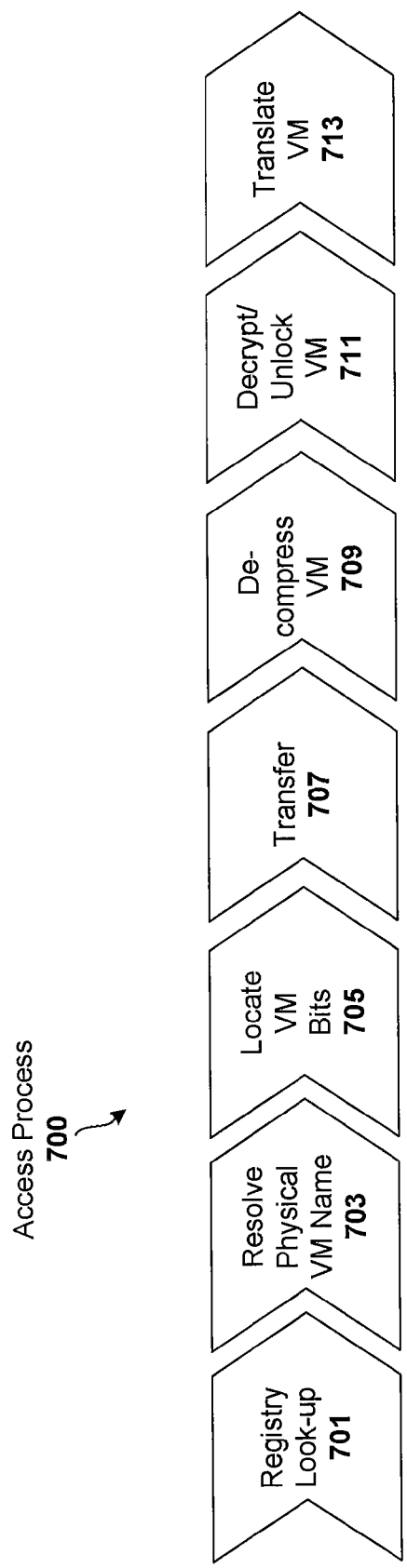
FIG. 7 illustrates a VM acquisition process configured in accordance with one embodiment of the present invention.

FIG. 7 illustrates a VM acquisition process 700 configured in accordance with one embodiment of the present invention. This process 700 operates to acquire a previously stored VM, which may be an original VM or VM copy. In any case, the VM being accessed by process 700 is generally referred to as the target VM, for purposes of this discussion.

The process 700 includes initiating 701 a registry look-up by implicitly requesting the target VM via logical name. The process 700 continues with resolving 703 the logical name into an explicit VM name, and locating 705 the storage location of the target VM. In accordance with one embodiment, and as previously explained, a UDDI registry or a SQL database look-up can be used to resolve the logical->physical VM name and location(s) of the target VM bits. The target VM is then looked-up using the explicit name to find the source location(s) of the physical VM bits. Consider the following example in Table 1, in which tags are used to compose logical names that implicitly refer to one or more VMs.

TABLE 1

| Tag | VM |
|---|---|
| Production | VM42 |
| Production | VM43 |
| Production | VM44 |
| Test | VM15 |
| Test | VM16 |
| Oracle ® | VM42 |
| Oracle ® | VM15 |
| Web Server | VM43 |
| Web Server | VM16 |
| Oracle ® | VM44 |

In more detail, Table 1 illustrates a number of tags, each of which corresponds to one or more explicitly named VMs. Note that some VMs can correspond to more than one tag (e.g., VM42 corresponds to Production and Oracle tags). The VMs can be specified, for example, using a URL or URI. By implicitly requesting a VM via single logical name or "tag," the explicit VMs associated with that tag are identified. By implicitly requesting a multiple tag logical name, only the explicit VMs associated with all requested tags are identified. For instance, with regard to the example of Table 1, requesting all Production VMs would result in the set of {VM42, VM43, VM44}; requesting all Oracle® VMs would result in the set of {VM42, VM15, VM44}; requesting all Production Oracle VMs would result in the set of {VM42, VM44}; requesting all Web Server VMs would result in the set of {VM43, VM16}; requesting all Production Web Server VMs would result in the set of {VM43}; and requesting all NON Oracle VMs would result in the set of {VM43, VM16}. The intersection processing of a multi-tag query can be done either on the server or client. For example, on the server, the logical name can be broken out into individual tags, and then each query made and the intersection of the resultant set of sets would be returned to the requesting client. On the client, a request for each tag making up the logical name can be made, and the intersection processing then performed on that client.

Note that such a tag-based registry look-up can also be used to locate all the members of a VM family. Consider, for example, the tagged VM families shown in Table 2. Here, requesting all Family A VMs would result in the set of {VM42, VM43, VM44}; requesting all Family B VMs would result in the set of {VM15, VM16, VM17}; requesting all Family C VMs would result in the set of {VM17, VM44, VM55, VM61}; and requesting all Family D VMs would result in the set of {VM35}. Thus, if necessary, all VMs belonging to a particular family can be accessed if so desired (e.g., such as the case when a family member is found to contain a virus or unlicensed software or is otherwise compromised).

TABLE 2

| Tag | VM |
|---|---|
| Family A | VM42 |
| Family A | VM43 |
| Family A | VM44 |
| Family B | VM15 |
| Family B | VM16 |
| Family C | VM17 |
| Family C | VM44 |
| Family C | VM55 |
| Family C | VM61 |
| Family D | VM35 |

The process 700 continues with transferring 707 the located VM bits to where the target host environment exists. These bits of the target VM can be transferred to the host environment using, for example, FTP, HTTP, HTTPS, or other such unicast or multicast transmission protocols.

The process 700 continues with decompressing 709 the target VM (e.g., after transfer), assuming the VM was stored and transferred in a compressed state. In one particular embodiment, the target VM is decompressed using GUNZIP decompression, assuming GZIP was used to compress the VM. The process 700 continues with decrypting and/or otherwise unlocking 711 the VM (e.g., after transfer), assuming the VM was stored and transferred in an encrypted/locked state. In one particular embodiment, the VM is decrypted and/or unlocked using AES128 decryption (assuming AES128 was used to encrypt the VM). Note that any decompression/decryption can be carried out before transfer as well, if so desired.

After transfer, the process 700 further includes translating 713 the target VM to the target host format, if necessary. As previously explained, the VM can be translated to the target host format using tools like PowerConvert apis from PlateSpin™. In alternative embodiments, this translation can take place prior to transferring the VM to the target host. In such a case, the VM can be compressed and/or encrypted after it is translated, if so desired. Further note that the translation can be performed offline (in advance of request) or in real-time (at time of request). In the case of offline translation, note that each specific VM format can have a unique explicit name and storage location, thereby effectively eliminating or otherwise reducing the need for post-request translation and reducing VM acquisition time.

The process 700 may further include other functionality as well. For instance, the process may include caching the bits of the target VM at various target locations/domains, in anticipation of subsequent requests for those VMs. In one particular embodiment, the VM is cached using an LRU (least recently used) caching scheme for subsequent requests in the target location/domain. Numerous VM caching schemes can be used here, including predictive or otherwise informed caching based on factors such as VM use history (e.g., this VM is consistently used on host machine #12), user permissions at a given location (e.g., the user of this machine can only use VM #1 and VM #7, so don't cache any other VMs), and host environment restrictions (e.g., only VM #s1-5 are currently authorized for use here, so cache no VMs). In this sense, the process 700 may include staging VMs at various locations, in anticipation of future execution requests. Further note that such caching schemes can be updated as permissions/authorizations change.

VM Policy Enforcement

In accordance with another embodiment of the present invention, when a request to initiate, start, boot (execute) a VM is detected, the content metadata and/or other aspects of the VM are checked against compliance policies, and a pre-execution determination is made as to allow VM execution or prevent it. In certain cases VM execution may be allowed with warnings issued to alert an operator console or auditing system (e.g., "The license for App#1 will expire in two days" or "This system must be upgraded to include SecurityApp#7 by tomorrow" or "A new security OS patch is now available, and will be automatically downloaded and installed"). In the case of execution being prevented, an alert/event sequence with details about why the execution was prevented, including the exact policy or policies that disqualified the VM from execution (e.g., "this VM must have SecurityPatch#1 installed prior to execution" in combination with an automatic patch download and install sequence), can be issued. In some embodiments, if the VM execution is not allowed due to policy non-compliance, the VM could be allowed to either: execute and adjust or otherwise correct the violation to bring itself into policy compliance (e.g., download and install latest set of security patches as soon as booted), or execute with no or limited network connectivity (e.g., in a sandbox or other limited execution environment) in order to perform problem isolation, recreation, and/or remediation.

Policies can be defined and stored in a database, directory, file, or any combination thereof (e.g., on SMP 309 and/or storage 109, and/or storage 117). Policies generally control when and how VMs can be executed. For instance, anti-malware policies can be used to prevent the execution of VMs based on the presence of malware. As is known, malware is software that can execute on a computing system to effect malicious intent of an attacker. Malware can take many forms, such as viruses, infectious worms, Trojan horse programs, rootkits (a type of Trojan horse, which is a collection of tools that allows an attacker to provide a backdoor into a target computing system), and spyware that monitors keystrokes and/or other user actions (e.g., surreptitious browser monitoring) on the computing system in order to capture sensitive information and/or to display unsolicited content (e.g., advertisements). Malware is usually imported into a target system via communications (unbeknownst to the user), such as those that occur when accessing and/or downloading from websites, or those received in the form of emails or text/instant messages. Other types of malware can remotely operate on a target system to conduct malicious or otherwise inappropriate activity (e.g., port scanning). Malware may also include adware, which is generally advertising/marketing material that is embedded within a software program (e.g., banner ads and other such unsolicited advertising).

Some policies might specify, for example:

No VM is allowed to execute if it contains malware (as detected by anti-malware applications).

No VM is allowed to execute if it contains a file named DOOM.EXE.

No VM is allowed to execute if it contains a file having a signature of xyz321 (e.g., where xyz321 is an MD5 signature for known malware or inappropriate content).

No Windows® VM can be executed unless it has Service Pack 2 installed.

No Linux®VM can be executed if it has WebSphere® installed.

No VM can be executed unless it is registered in Configuration Management Database (or other suitable registry) with the correct MD5 signature information (or other suitable signature info).

No VM can be executed if InstalledApplication=Oracle® and no OracleLicense.TXT present.

No VM can execute with a system signature of 567abc.

No super user (or other such superior account access and/or authority) status for VMs having non-administrative context.

No VMs having a test context can be operated in a production context.

Certain production VMs cannot be executed on $2^{nd}$ and 3 shifts (i.e., outside of the 8 am to 5 pm work schedule) when full production support teams are not available.

No VM can be executed by unauthorized user and/or unmanaged host.

Note that the actual storing and specification of a policy can be much more cryptic. For example there may be a DO_NOT_RUN file or database table containing entries like: FILENAME=DOOM.EXE and FILEMD5=xyz321 (corresponding to the first two sample policies above).

The enforcement/compliance scheme may also include a REQUIRED or MANDATORY policy list, where any VM/system that does not have the mandatory content is denied execution (e.g., must have virus scanning software to be compliant). Other policies may include:

Registry Verification: check to see if VM is registered (e.g. in a CMDB) and if registration is current; if not registered or current, then deny the execution and initiate registration process.

License verification: check license information against logical metadata indicating which applications are installed and/or started. If license count would be exceeded by the VM executing with the typical/registered execution profile, then deny or optionally wait for a license to become available.

If VM is compliant, then allow to execute or optionally request key to unlock the encrypted VM, decrypt the VM, and then execute. If all conditions for execution are satisfied except for a time based condition (e.g., not allowed to execute in requested window or no license available now), then optionally allow VM to execute when condition is cleared or otherwise satisfied (e.g., either queue or retry later).

Capturing signatures for the files allows for very fast comparison. For example, to prevent DOOM.EXE from running on VMs of the managed system, a signature for the DOOM.EXE file can be computed by performing an MD5 calculation of the file. That signature can then be compared against other file signatures very quickly using traditional hash table lookups. For an entire system, a signature of the entire VM contents would allow for quick system level comparison without having to compare all of the files or all of the sub-signatures. This would allow for a quick allowing/disallowing of a specific system based on its system signature, regardless of what the VM might be named. One embodiment of the present invention generates a system signature by taking all the file signatures and creating a file or structure containing those signatures, and then generating a signature for that file or structure using an MD5 or similar process, as previously explained with reference to FIG. 5.

One way to handle signature-based policies is to use the concept of Blacklist, Greylist, or Whitelist used in network security applications. Instead of an IP address, a VM file name, content signature, or system signature can be used in such lists. For example, if a file name of DOOM.EXE is placed in the Blacklist file, any VM system containing it will not be allowed to execute. Likewise, the content signature for DOOM.EXE could also be placed in the list, and any system containing that signature will not be allowed to execute. Use of a signature (as opposed to an explicit name) will ensure proper compliance even if someone has renamed the prohibited file. In a similar manner, an entire system signature for a "good/compliant" VM can be placed in the Whitelist, and only VM systems having that signature will be allowed to execute. In a similar manner, entire system signatures for known "bad" VMs can be placed in the Blacklist, and VMs on that list will not be allowed to execute. Thus, in this embodiment the Whitelist would identify known good contents, the Blacklist would identify known bad contents, and the Greylist (which is effectively a temporary Blacklist) could contain dubious content, perhaps requiring additional processing or operator intervention to allow execution.

Figure 8A:
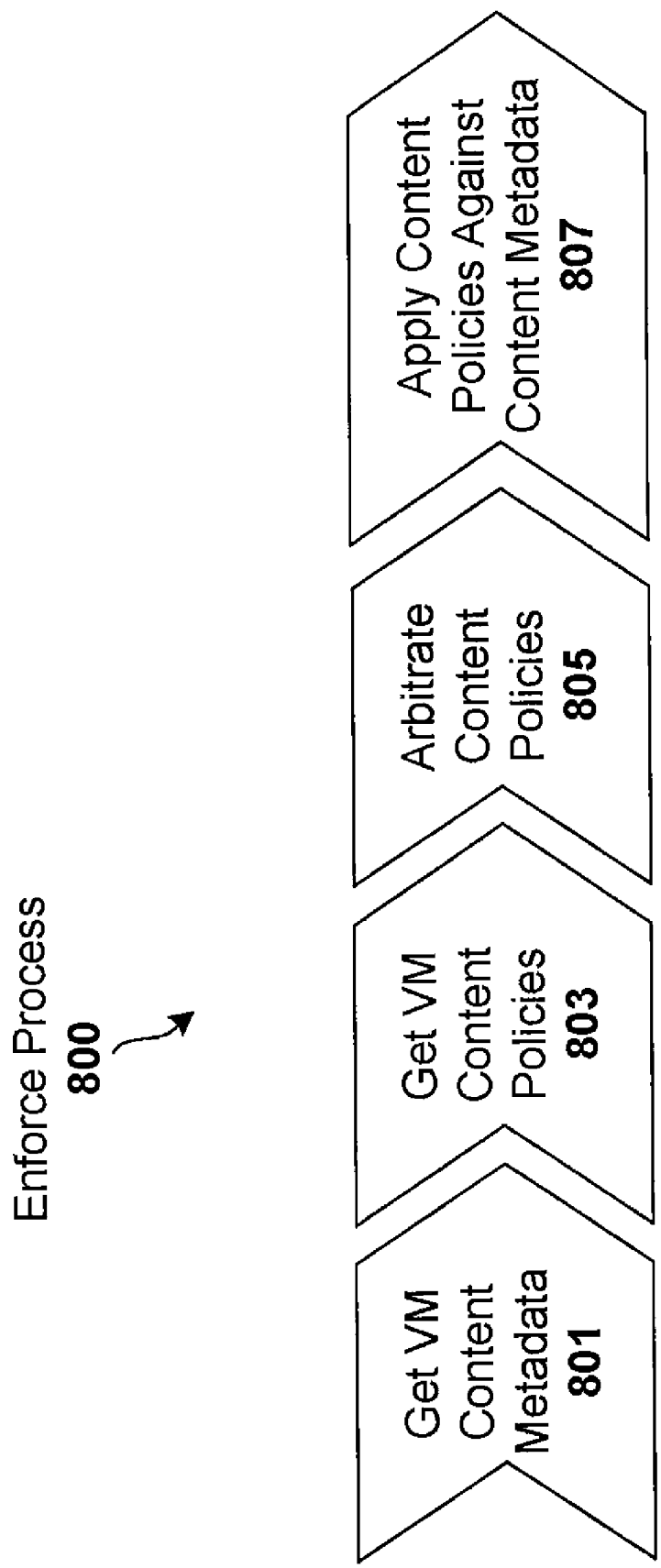
FIG. 8a illustrates a policy enforcement process for a virtual environment, in accordance with one embodiment of the present invention.

FIG. 8a illustrates a policy enforcement process 800 for a virtual environment, in accordance with one embodiment of the present invention. This process 800 operates to enforce policies against a VM, which may be an original VM or VM copy. In any case, the VM being operated on by process 800 is generally referred to as the target VM, for purposes of this discussion.

The process 800 includes getting 801 content metadata of the target VM. For example, the VM content metadata can be extracted in real-time. Alternatively, the VM content metadata can be pre-extracted metadata that is stored and accessible to the process 800. The content metadata may include, for example, both physical (e.g., file system, registry, index, etc) and logical (e.g., installed applications, started services) components. In more detail, and in accordance with an embodiment of the present invention, the content metadata on a VM containing Windows® or Linux® includes the Master Boot Record (MBR) and the file system tree (e.g., names, sizes, permissions, dates, tattoos, signatures, actual data backing each file). Also, and with particular regard to a Windows® system, the content metadata includes embedded version information for each executable and/or dynamic link library. Also, the content metadata includes the registry from the file system. Also, the content metadata includes system level information (e.g., Service Pack, Patches, Build #), services, installed applications, auto-started applications, accounts (e.g., Userids, Groups, Home Directory, Shell Program, Quotas), network information, and other such information from the Windows® Registry. With particular regard to a Linux® system, the content metadata includes, for example, system level information, daemons or services (e.g., /etc/rc.d/init.d/directory), accounts (e.g., Userids, Groups, Home Directory, Shell Program, Quotas) such as /etc/passwd, installed applications, auto-started applications, and network information. In addition, recall that pre-extracted metadata can be stored locally to the target VM (e.g., in the SMP 309 or other dedicated partition) or remotely to the target VM (e.g., in storage 109 or 117). In one particular embodiment, the getting 801 step includes the following sequence: attempt to read content metadata on the target VM; if not available on VM, then attempt to read content metadata stored elsewhere like storage 109 or 117 (e.g., CMDB); and if the content metadata is not available at alternate storage, then derive content metadata in real-time (e.g., such as described with reference to metadata extraction process 503). Additional details of the getting step will be discussed with reference to FIGS. 8b-d.

The process 800 further includes getting 803 compliance policies regarding VM content, and arbitrating 805 the compliance policies for priority, conflict, or deadlocks. The compliance policies can be read, for example, from an SQL database or an LDAP directory (e.g., such as from storage 109 or 117). An example arbitration scheme uses +++, ++, +, −, −−, −−− as an attribute in each compliance policy for relative strength or priority indicator to resolve conflicts and arbitrate on compliance policies (e.g., a policy having an attribute of "+++" would take priority over a policy having an attribute of "+"). In the event of a tie (e.g., where two competing policies have an attribute of "+++"), a tie-breaking mechanism can be used (e.g., older policy wins, or some other acceptable tie-breaker). Attributes and tie-breakers can be set as desired by an administrator of the managed system.

The process 800 continues with applying 807 the compliance policies against the content metadata of VM. Example results of applying the policies against the content metadata include allow execution (i.e., content metadata is compliant with policies), disallow (i.e., content metadata is non-compliant with policies), or retry based on what content is required, allowed or disallowed. Comparisons performed by application of policies can require, for example, exact pattern matching. For example: If Filename present (Doom.exe) THEN NOEXEC or IF Filename.missing (LICENSE.*) THEN NOEXEC). Recall that compliance can be tested by comparing signatures (e.g., MD5 or other hashes) of the content metadata against signatures of known blacklisted, grey listed, and white listed content. Fuzzy pattern matching may also be used, to allow for degrees of matching (as opposed to exact pattern matching). As previously explained, the enforcement process 800 may also execute one or more plug-ins to assist in the enforcement of the compliance scheme. Also, there may be exceptions to various policies (e.g., files known to be secure are excused from the virus scanning processes, or VM22 is exempt from policies 2-5).

Figure 8B:
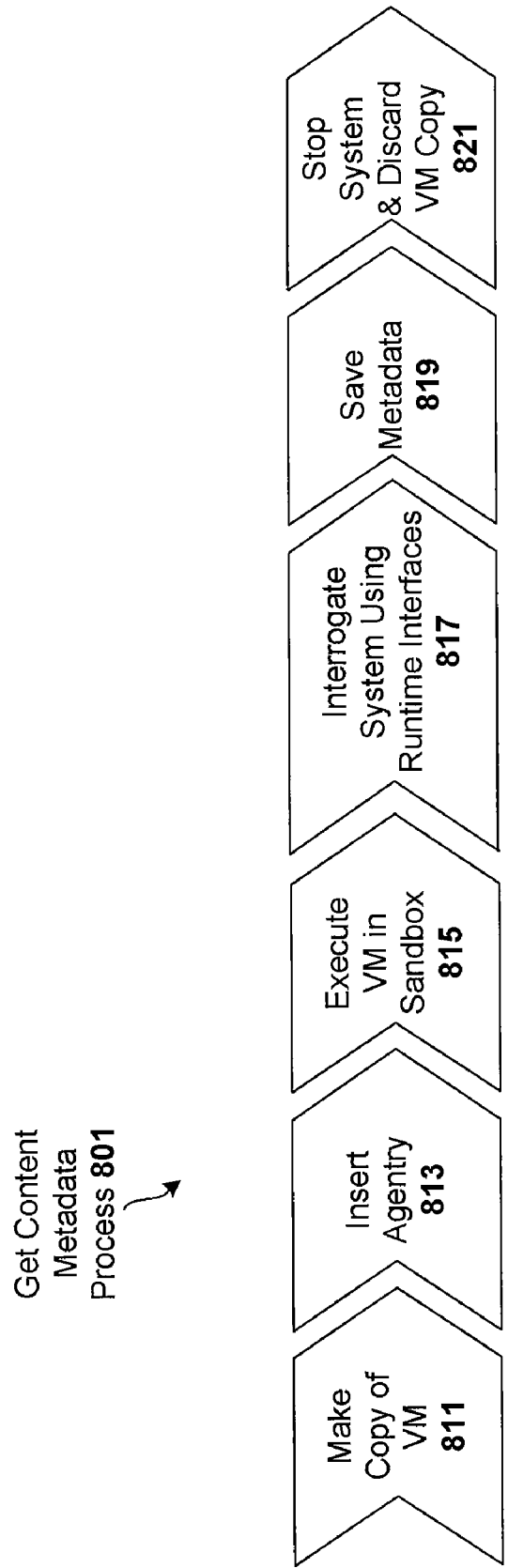
FIGS. 8b-d each illustrate a get VM data process configured in accordance with one embodiment of the present invention.

FIG. 8b illustrates a get VM content metadata process 801 configured in accordance with one particular embodiment of the present invention. In this example embodiment, process 801 includes making 811 a copy of the target VM to operate on, and injecting 813 the necessary amount of changes into the VM copy to execute the system (e.g., minimal agentry to make the VM copy executable). The process 801 continues with executing 815 the VM copy in a secure, isolated host or sandbox (e.g., no network access, no SAN, limited resource access). The process 801 continues with interrogating 817 the now running VM copy using runtime interfaces (e.g., Windows® WMI) to gather the content metadata, and saving 819 that content metadata (e.g., to the SMP 309 or external storage facility such as 109 or 117). The process 801 continues with stopping the system and discarding 821 the VM copy.

Figure 8C:
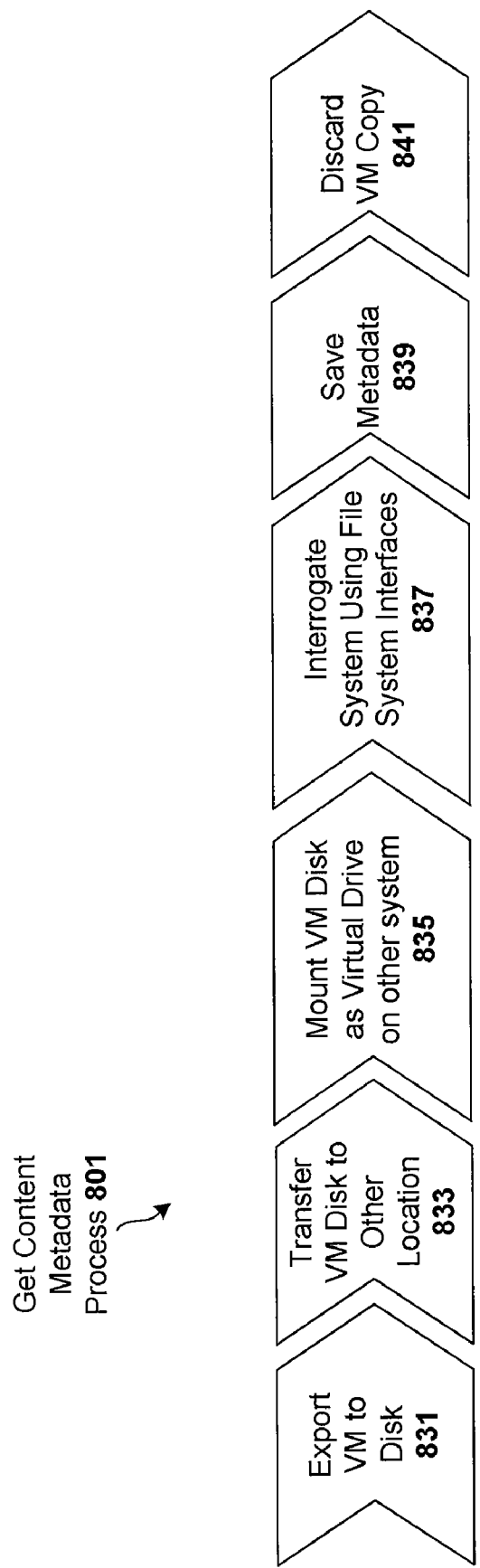

FIG. 8c illustrates a get VM content metadata process 801 configured in accordance with another particular embodiment of the present invention. In this example embodiment, process 801 includes exporting 831 the target VM to disk or other such portable storage media (e.g., using VMware® Disktools Export or other such tools), and then transferring 833 the VM disk to another location for analysis (e.g., using FTP or other suitable transmission protocol), such as a server system like server 115 or to the enterprise VM manager 111. The process 801 proceeds with mounting 835 the VM disk as a virtual drive at the other location via the local system (e.g., on a Windows® Server system, issue a "vmware-mount V:

vm.vmdk" command), and interrogating 837 the system using file system interfaces (e.g., read the file system or system registry of a Windows® based VM) to gather the content metadata. The process 801 continues with saving 839 the content inetadata (e.g., to the SMP 309 or other storage facility such as 109 or 117), and discarding 841 the target VM from the disk to which it was exported.

Figure 8D:
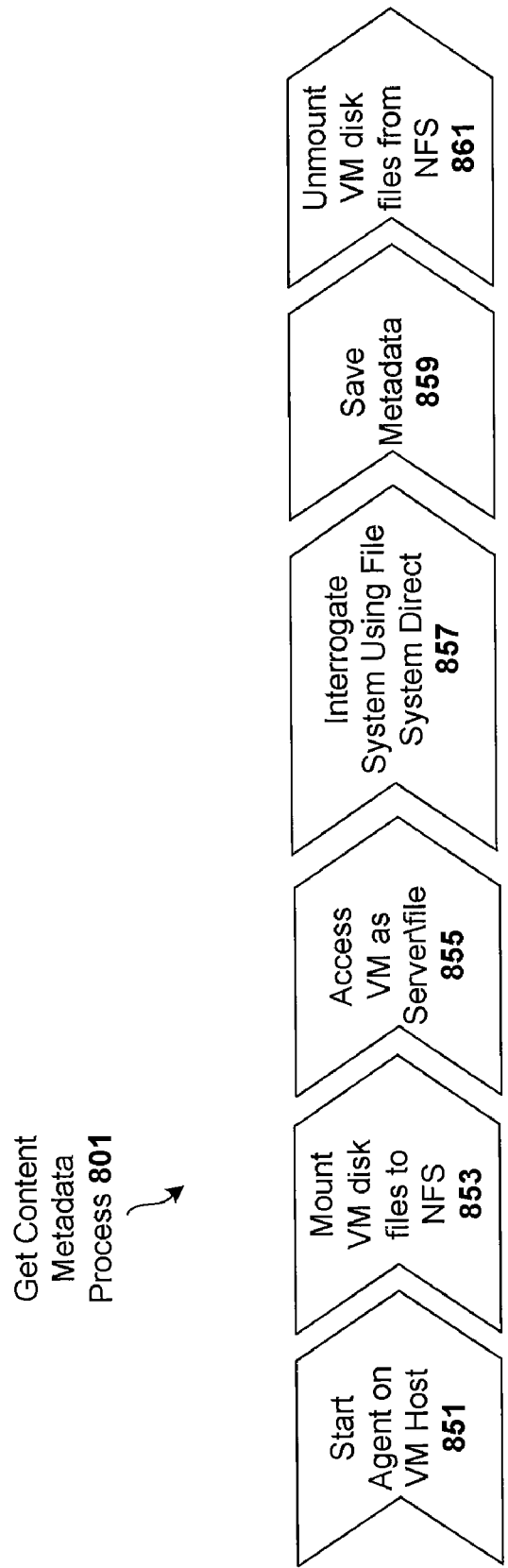

FIG. 8d illustrates a get VM content metadata process 801 configured in accordance with another particular embodiment of the present invention. In this example embodiment, process 801 includes starting 851 an agent on the target VM host machine (e.g., VMware® ESX Server), and mounting 853 the VM disk files to an NFS associated with the host machine (NFS=Network File System, which is a protocol that allows a machine to mount a disk of another machine locally or over a network). The process 801 continues with accessing 855 (via the agent) the VM disk from the same or other system using file share (e.g., \\server\drive\file). The process 801 further includes interrogating 857 (via the agent) the system using file system direct (e.g., fopen, fclose) to gather the content metadata. The process 801 continues with saving 859 the content metadata (e.g., to the SMP 309 or other storage facility such as 109 or 117), and unmounting 861 the disk files of the target VM from the NFS.

VM Adaptation

Figure 9:
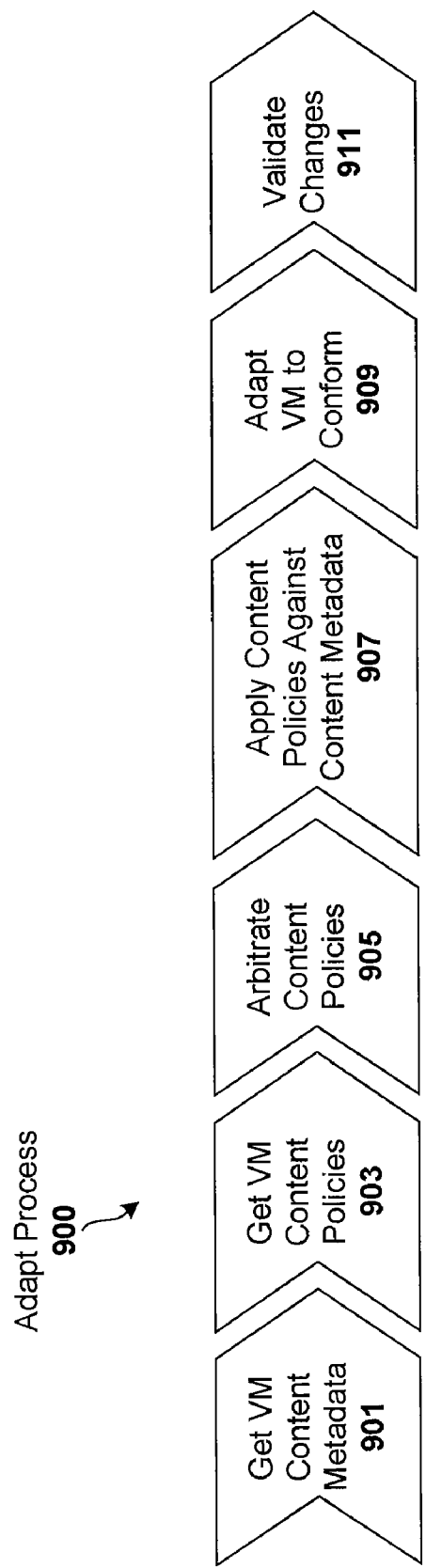
FIG. 9 illustrates a VM adaptation process configured in accordance with one embodiment of the present invention.

FIG. 9 illustrates a VM adaptation process configured in accordance with one embodiment of the present invention. This process 900 operates to adapt a non-compliant VM, which may be an original VM or VM copy. This adaptation may be temporary (where changes made are discarded post-execution) or permanent (where changes made are committed to effectively evolve the VM). In any case, the VM being operated on by process 900 is generally referred to as the target VM, for purposes of this discussion.

The first steps of process 900 are similar to those discussed with reference to process 800, and include: getting 901 content metadata of the target VM; getting 903 compliance policies regarding VM content; arbitrating 905 the compliance policies for priority, conflict, or deadlocks; and applying 907 the content compliance policies against the content metadata of VM. The previous discussion with reference to corresponding steps 801, 803, 805, and 807 is equally applicable here.

In addition, when the VM does not satisfy one or more policies or is otherwise found to be non-compliant, then process 900 continues with adapting 909 the VM to conform. Adaptation can be, for example, via direct manipulation and/or insertion of files, settings, and data into the target VM (e.g., update virus definitions, install anti-virus software and/or security patches, run anti-virus scanning application (an other malware detection/eradication applications), enable firewall and/or adjust firewall settings, delete unauthorized content, obtain necessary licensing or automatically issue email notification to administrator to obtain additional licensing, and any other such remedial activity). The adapting 909 may also include scheduling of other agents or processes to correct non-compliances or otherwise carry out remedial action. For instance, the adapting 909 may engage a download agent to fetch updates or security patches, and/or a virus scanning agent to search for and eradicate viruses and/or other malware. The adapting 909 may also include the scheduling of required VM start time processes (e.g., Windows® RunOnce) to make adjustments. The adapting 909 may also include restricting or otherwise adjusting access and/or user permissions, so that the target VM can/cannot access certain content, resources, or areas of the managed network. Numerous such adaptations can be made, whether those adaptations operate to provide direct VM content changes or indirect VM content changes. The adapting 909 can also interface with external processes and databases (e.g., to make sure that a particular VM is registered in a CMDB or asset database).

After adaptation is performed/scheduled, the process 900 may further include validating 911 any changes made during the adaptation process. In one such embodiment, a validation test is requested or otherwise performed to validate the changes were successfully made. For instance, the validation test may include repeating steps 901, 903, 905, and 907 (or some combination thereof, such as 901 and 907, since it may not be necessary to repeat step 903 and 905).

Learn and Optimize

Figure 10:
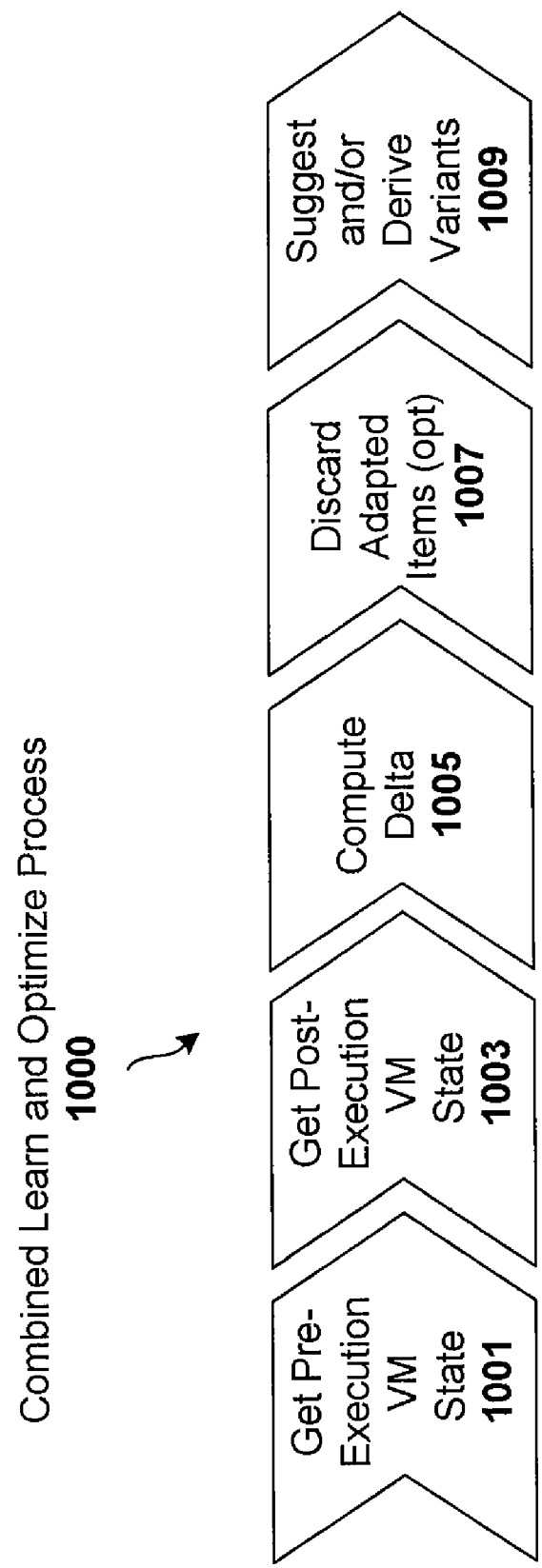
FIG. 10 illustrates a combined learn and optimization process in accordance with one embodiment of the present invention.

FIG. 10 illustrates a combined learn and optimization process 1000 in accordance with one embodiment of the present invention. This process 1000 operates to learn adaptations made to a VM (e.g., to achieve policy compliance or other desired change), and to optimize the VMs so that future adaptations can be reduced (thereby effectively evolving the VM). Such optimization/evolution is particularly useful for adaptations that are consistently made over a period of time. In any case, the VM being operated on by process 1000 is generally referred to as the target VM, for purposes of this discussion.

The process 1000 includes getting 1001 a pre-execution state of the target VM, and getting 1003 a post-execution state of the target VM, and then computing 1005 the delta to show changes made to the target VM. These changes to the target VM may have been made during pre-execution adaptation as discussed herein. Alternatively, or in addition to, changes to the target VM could have been made during execution (e.g., by the user). In one particular embodiment, computing 1005 the delta between the pre- and post-execution states includes differencing the content metadata or the actual content itself. The differences can be captured into a profile database, so that changes can then be analyzed. Alternatively, computing 1005 the delta includes reading a delta file created during VM execution (e.g., redo, undo, diff files), which only has the differences. In any case, and as previously explained, such captured difference data provides insight into more efficient VM management. For example, such data can be analyzed to detect what software that was installed, removed, or updated, as well as other system changes (e.g., paging file, accounts, event log). Also, regularly performed adaptations can be detected, based on view of historical data (e.g., service packs that are reapplied during each VM use session, and software that is consistently re-installed or removed during each VM use session).

The process 1000 may continue with discarding 1007 one or more of the adaptations made, if adaptation is found to be undesired or otherwise not appropriate for permanent use. The process may further continue with suggesting and/or deriving 1009 variants of the target VM, so as to provide an optimized VM that will require fewer adaptations going forward. For example, a new optimized VM can be derived without previously installed under-utilized applications, thereby conserving license use. Likewise, a new optimized VM can be derived to permanently include a security patch or other software that has been historically and consistently installed during adaptation of a VM. Thus, the optimization can be based on single or multiple executions of a VM. Likewise, executions/adaptations of multiple VMs included in a group can be analyzed to determine the commonality of adaptations made. If changes are consistently made to a quorum (or any such metric that indicates consistency of the VM group) of the VMs included in the set analyzed, then optimizations can confidently be made to the entire set, even if data for some of the VMs in the set is not available. In any case, optimized VMs are provided that pre-include all common delta items.

The foregoing description of the embodiments of the invention has been presented for the purposes of illustration and description. It is not intended to be exhaustive or to limit the invention to the precise form disclosed. Many modifications and variations are possible in light of this disclosure. For instance, numerous suitable execution platforms and VM formats can be used as a host, and the term host is not intended to limit the present invention to any particular environment, structure, format, or the like. Likewise, the term virtual machine as used herein is intended to include all virtual systems, including virtual appliances, virtual applications, special-purpose virtual processing environments, and other such virtual manifestations that can benefit from the management and/or control techniques discussed herein.

What is claimed is:

1. An apparatus for enforcing a policy associated with a virtual machine, the apparatus comprising:
a computing device communicatively coupled to a virtual machine, the computing device being programmed to:
receive a virtual machine event request;
receive first data from within the virtual machine in response to receiving the virtual machine event request;
receive second different data from an environment outside the virtual machine in response to receiving the virtual machine event request;
detect internal non-compliance by the virtual machine of a first policy-based compliance scheme based on the first data;
detect external non-compliance by the virtual machine as provided in the environment of a second different policy-based compliance scheme based on second different data;
adapting the virtual machine to comply with the first policy-based compliance scheme by manipulating the virtual machine;
adapting the environment to comply with the second policy-based compliance scheme; and
processing the virtual machine event request after adapting the virtual machine and the environment.

2. The apparatus of claim 1, wherein the virtual machine event request includes a stop virtual machine request.

3. The apparatus of claim 1, wherein the virtual machine event request includes a pause virtual machine request.

4. The apparatus of claim 1, wherein the virtual machine event request includes a move virtual machine request.

5. The apparatus of claim 1, wherein the virtual machine event request includes a clone virtual machine request.

6. The apparatus of claim 1, wherein the virtual machine event request includes a create new virtual machine request.

7. The apparatus of claim 1, wherein the virtual machine event request includes a display virtual machine from template request.

8. The apparatus of claim 1, wherein the non-compliance includes at least one of software that has not been installed on the virtual machine, software that has been removed from the virtual machine, and software that has not been updated on the virtual machine.

9. The apparatus of claim 1, wherein adapting the virtual machine includes insertion of data into the virtual machine.

10. The apparatus of claim 1, wherein adapting the virtual machine includes at least one of updating a virus definition, installing anti-virus software, installing a security patch, executing an anti-virus scanning application, removing malware, and disabling malware.

11. The apparatus of claim 10, wherein the malware includes at least one of a virus, worm, trojan horse, rootkit, spyware, and adware.

12. The apparatus of claim 1, wherein adapting the virtual machine includes adjusting security settings associated with the virtual machine.

13. The apparatus of claim 1, wherein adapting the target virtual machine comprises deleting unauthorized content from the virtual machine.

14. The apparatus of claim 1, wherein adapting the virtual machine includes at least one of obtaining necessary licensing associated with the virtual machine and automatically issuing a notification to an administrator to obtain licensing associated with the virtual machine.

15. The apparatus of claim 1, wherein adapting the target virtual machine includes scheduling at least one of an agent and a process to carryout remedial action.

16. The apparatus of claim 15, wherein scheduling at least one of an agent or process includes at least one of requesting, transferring, downloading, and installing at least one of security updates for the virtual machine and security patches for the virtual machine.

17. The apparatus of claim 15, wherein scheduling at least one of an agent or process includes at least one of searching for and eradicating malware associated with the virtual machine.

18. The apparatus of claim 15, wherein scheduling at least one of an agent or process includes registering the virtual machine for use in a managed system.

19. The apparatus of claim 1, wherein adapting the virtual machine includes restricting access permissions, so that the virtual machine can only access certain content, resources, and areas of a managed system.

20. The apparatus of claim 1, wherein adapting the virtual machine includes at least one of adding, updating, and deleting user account information, so as to limit account authority associated with the virtual machine.

21. The apparatus of claim 1, wherein adapting the virtual machine includes validating adaptations made to the virtual machine.

22. The apparatus of claim 21, wherein validating adaptations made includes repeating policy-based compliance testing that was used to determine the virtual machine was non-compliant.

23. The apparatus of claim 1, wherein the virtual machine is at least one of a virtual application and a virtual appliance.

24. The apparatus of claim 1, wherein the virtual machine is part of a group that includes a plurality of virtual machines, and the computing device is programmed to adapt the virtual machine when a quorum of the plurality of virtual machines have been adapted.

25. The apparatus of claim 1, wherein the environment is at least one of a virtual machine manager, a host environment, a management agent, and an execution platform.

* * * * *